(12) United States Patent
Bone et al.

(10) Patent No.: US 10,439,991 B2
(45) Date of Patent: Oct. 8, 2019

(54) COMMUNICATING WITH A MACHINE TO MACHINE DEVICE

(71) Applicant: VODAFONE IP LICENSING LIMITED, Newbury, Berkshire (GB)

(72) Inventors: Nick Bone, Newbury (GB); Tim Snape, Newbury (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 140 days.

(21) Appl. No.: 15/021,873

(22) PCT Filed: Sep. 12, 2014

(86) PCT No.: PCT/GB2014/052766
§ 371 (c)(1),
(2) Date: Mar. 14, 2016

(87) PCT Pub. No.: WO2015/036771
PCT Pub. Date: Mar. 19, 2015

(65) Prior Publication Data
US 2016/0234182 A1    Aug. 11, 2016

(30) Foreign Application Priority Data

Sep. 13, 2013 (GB) .................................. 1316370.4
Oct. 16, 2013 (GB) .................................. 1318339.7
May 30, 2014 (GB) .................................. 1409641.6

(51) Int. Cl.
*H04L 29/06* (2006.01)
*H04W 4/70* (2018.01)
(Continued)

(52) U.S. Cl.
CPC ............ *H04L 63/04* (2013.01); *G06F 9/4401* (2013.01); *G06F 13/1689* (2013.01);
(Continued)

(58) Field of Classification Search
CPC .. H04L 63/062; H04L 63/029; H04L 63/0869; H04L 63/10; H04L 63/08;
(Continued)

(56) References Cited

U.S. PATENT DOCUMENTS 7,069,452 B1    6/2006 Hind et al.
7,360,129 B2    4/2008 Tang
(Continued)

FOREIGN PATENT DOCUMENTS

DE    10 2010 010760    9/2011
EP    2 536 173    12/2012
(Continued)

OTHER PUBLICATIONS

Office Action issued in U.S. Appl. No. 15/021,879 dated Dec. 26, 2017.
(Continued)

*Primary Examiner* — Amir Mehrmanesh
(74) *Attorney, Agent, or Firm* — Workman Nydegger

(57) ABSTRACT

The present disclosure provides a bootstrapping server, a network application function (NAF), a system and methods for establishing secure communication between a machine to machine (M2M) device and a NAF. A method for establishing secure communication between the NAF and M2M device comprises receiving a first data object, tunneling the first data object to the M2M device, via an interface between the NAF and the M2M device, for enabling the M2M device to derive first information to establish said secure communication, receiving a second data object and deriving second information for use in establishing said secure communication with the M2M device.

6 Claims, 12 Drawing Sheets

(51) Int. Cl.
| | |
|---|---|
| H04W 4/50 | (2018.01) |
| H04W 4/14 | (2009.01) |
| H04W 12/02 | (2009.01) |
| H04W 12/04 | (2009.01) |
| H04W 88/02 | (2009.01) |
| H04W 88/06 | (2009.01) |
| H04L 29/08 | (2006.01) |
| H04W 28/08 | (2009.01) |
| H04W 80/06 | (2009.01) |
| G06F 21/60 | (2013.01) |
| H04B 1/3816 | (2015.01) |
| G06F 13/16 | (2006.01) |
| G06F 13/28 | (2006.01) |
| G06F 13/40 | (2006.01) |
| H04W 4/12 | (2009.01) |
| H04W 12/06 | (2009.01) |
| H04W 52/02 | (2009.01) |
| G06F 21/71 | (2013.01) |
| H04L 9/08 | (2006.01) |
| H04W 8/04 | (2009.01) |
| G06F 9/4401 | (2018.01) |
| H04W 12/00 | (2009.01) |

(52) U.S. Cl.
CPC .......... *G06F 13/28* (2013.01); *G06F 13/4027* (2013.01); *G06F 21/606* (2013.01); *G06F 21/71* (2013.01); *H04B 1/3816* (2013.01); *H04L 9/0861* (2013.01); *H04L 63/029* (2013.01); *H04L 63/0428* (2013.01); *H04L 63/0442* (2013.01); *H04L 63/061* (2013.01); *H04L 63/062* (2013.01); *H04L 63/08* (2013.01); *H04L 63/0823* (2013.01); *H04L 63/0869* (2013.01); *H04L 63/0876* (2013.01); *H04L 63/10* (2013.01); *H04L 63/166* (2013.01); *H04L 63/20* (2013.01); *H04L 67/1095* (2013.01); *H04L 67/125* (2013.01); *H04L 67/42* (2013.01); *H04W 4/12* (2013.01); *H04W 4/14* (2013.01); *H04W 4/50* (2018.02); *H04W 4/70* (2018.02); *H04W 8/04* (2013.01); *H04W 12/0027* (2019.01); *H04W 12/02* (2013.01); *H04W 12/04* (2013.01); *H04W 12/04031* (2019.01); *H04W 12/06* (2013.01); *H04W 28/08* (2013.01); *H04W 52/0229* (2013.01); *H04W 80/06* (2013.01); *H04W 88/02* (2013.01); *H04W 88/06* (2013.01); *H04L 63/0838* (2013.01); *H04L 2463/061* (2013.01); *Y02D 10/14* (2018.01); *Y02D 10/151* (2018.01); *Y02D 70/00* (2018.01); *Y02D 70/1222* (2018.01); *Y02D 70/1224* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/166* (2018.01); *Y02D 70/168* (2018.01); *Y02D 70/21* (2018.01); *Y02D 70/22* (2018.01)

(58) Field of Classification Search
CPC .............. H04L 67/1095; H04L 63/0428; H04L 63/0823; H04L 63/166; H04W 12/04; H04W 4/005; H04W 12/06; H04W 4/70; H04W 12/04031; H04W 12/14; H04W 12/02; H04W 88/02; H04W 88/06; H04W 4/12; H04W 52/0229; G06F 13/1689; G06F 13/28; G06F 13/4027
See application file for complete search history.

(56) References Cited

U.S. PATENT DOCUMENTS

| | | |
|---|---|---|
| 8,934,453 B1 | 1/2015 | Sarnaik et al. |
| 9,603,189 B2 | 3/2017 | Holtmanns et al. |
| 9,800,621 B2 | 10/2017 | Starsinic |
| 2003/0033591 A1 | 2/2003 | Fournier |
| 2003/0051140 A1* | 3/2003 | Buddhikot ............ H04L 63/062 713/169 |
| 2003/0123669 A1 | 7/2003 | Koukoulidis et al. |
| 2003/0229686 A1 | 12/2003 | Kortright |
| 2003/0229786 A1 | 12/2003 | Hollis et al. |
| 2005/0120106 A1 | 6/2005 | Alertao |
| 2006/0182280 A1 | 8/2006 | Laitinen et al. |
| 2006/0196931 A1 | 9/2006 | Holtmanns et al. |
| 2006/0251257 A1 | 11/2006 | Haverinen et al. |
| 2007/0118560 A1 | 5/2007 | Bornhoevd |
| 2007/0169107 A1 | 7/2007 | Huttunen |
| 2007/0234041 A1 | 10/2007 | Lakshmeshwar et al. |
| 2007/0240205 A1 | 10/2007 | Holtmanns et al. |
| 2007/0248232 A1 | 10/2007 | Driscoll et al. |
| 2008/0153521 A1 | 6/2008 | Benaouda |
| 2009/0138955 A1 | 5/2009 | Vinayakray-jani |
| 2010/0302009 A1 | 12/2010 | Hoeksel |
| 2010/0304716 A1 | 12/2010 | Hoeksel |
| 2011/0010543 A1 | 1/2011 | Schmidt et al. |
| 2011/0126017 A1 | 5/2011 | Blom et al. |
| 2011/0132987 A1 | 6/2011 | Hoeksel |
| 2011/0137916 A1 | 6/2011 | Deen et al. |
| 2011/0173450 A1 | 7/2011 | Knobbe et al. |
| 2011/0265158 A1 | 10/2011 | Cha et al. |
| 2011/0289315 A1 | 11/2011 | Laitinen et al. |
| 2011/0320802 A1 | 12/2011 | Wang et al. |
| 2012/0041867 A1 | 2/2012 | Glodjo et al. |
| 2012/0072979 A1 | 3/2012 | Cha |
| 2012/0311335 A1 | 12/2012 | Fransen |
| 2012/0322457 A1 | 12/2012 | Lee |
| 2013/0012159 A1 | 1/2013 | Lodeweyckx |
| 2013/0016657 A1 | 1/2013 | Muhanna et al. |
| 2013/0039493 A1 | 2/2013 | Bauernfeind |
| 2013/0212236 A1 | 8/2013 | Foti et al. |
| 2013/0217361 A1 | 8/2013 | Mohammed |
| 2013/0275758 A1 | 10/2013 | Marlow |
| 2014/0011478 A1 | 1/2014 | Collins et al. |
| 2014/0040988 A1 | 2/2014 | Nozulak |
| 2014/0146826 A1 | 5/2014 | Herriot |
| 2014/0179263 A1 | 6/2014 | Collins et al. |
| 2014/0179360 A1 | 6/2014 | Jackson |
| 2014/0189075 A1 | 7/2014 | Stansell et al. |
| 2014/0233735 A1 | 8/2014 | Zhang |
| 2014/0235285 A1 | 8/2014 | Stojanovski |
| 2014/0315514 A1 | 10/2014 | Collins et al. |
| 2014/0330952 A1 | 11/2014 | Starsinic |
| 2015/0023219 A1 | 1/2015 | Jin |
| 2015/0133077 A1 | 5/2015 | Collins et al. |
| 2015/0215163 A1 | 7/2015 | Kowalski et al. |
| 2015/0244676 A1 | 8/2015 | Collins et al. |
| 2015/0296379 A1 | 10/2015 | Nix |
| 2015/0319156 A1 | 11/2015 | Guccione et al. |
| 2015/0332399 A1 | 11/2015 | Glodjo et al. |
| 2016/0036779 A1 | 2/2016 | Collins et al. |
| 2016/0226828 A1 | 8/2016 | Bone et al. |
| 2016/0226847 A1 | 8/2016 | Bone et al. |
| 2016/0232116 A1 | 8/2016 | Bone et al. |
| 2016/0234181 A1 | 8/2016 | Bone et al. |
| 2016/0234255 A1 | 8/2016 | Bone et al. |
| 2016/0234683 A1 | 8/2016 | Bone et al. |

FOREIGN PATENT DOCUMENTS

| | | |
|---|---|---|
| EP | 2 654 332 | 10/2013 |
| EP | 2 713 642 | 4/2014 |
| KR | 20130127826 A | 11/2013 |
| WO | WO2004/114144 | 12/2004 |
| WO | WO 2007042345 | 4/2007 |
| WO | WO 2009/004590 A2 | 1/2009 |
| WO | WO 2010102259 A2 | 9/2010 |

(56) References Cited

FOREIGN PATENT DOCUMENTS

| WO | WO 2011085810 | 7/2011 |
|---|---|---|
| WO | WO2011/131220 A1 | 10/2011 |
| WO | WO 2012062077 | 5/2012 |
| WO | WO 2012/094879 | 7/2012 |
| WO | WO2012131659 | 10/2012 |
| WO | WO 2012/151819 | 11/2012 |
| WO | WO 2013/060302 A1 | 5/2013 |
| WO | WO 2013/113162 | 8/2013 |
| WO | WO 2013/120225 | 8/2013 |
| WO | WO 2014041806 | 3/2014 |
| WO | WO 2014165747 | 10/2014 |

OTHER PUBLICATIONS

Nhon Chu et al: "OMA DM v1.x compliant Lightweight Device Management for Constrained M2M devices", European Transactions on Telecommunications, Aug. 5, 2013 (Aug. 5, 2013), pp. 517-531, XP055155504, DOI: 10.1002/ett Retrieved from the Internet: URL:http://www.leftfoot.rs/nenad_gligoric/publications/omadm.pdf [retrieved on Nov. 27, 2014] Anstract Section 3 Section 6.

Fujitsu et al: OMA-DM M2M Considerations OMA-DM-2011-0070R02-INP M2M Considerations OMA-DM-2011-0070R02-INP M2M IOMAT, 4330 La Jolla Village Dr., Suite 110 San Diego, CA 92122 ; USA May 2, 2011 (May 2, 2011), pp. 1-23, XP064066725, Retrieved from the Internet: URL:ftp/Public documents/DM/2011/ [retrieved on May 24, 2011] the whole document.

"M2M(11)0278r3 Discussion Materialfor Joint Conference all with OMA DM; M2M(11)0278r3 Discussion Material_ for Joint Conference Call with OMA DM", M21(11)02780 Discussion Material for Joint Conference Call With OMA DM, Open Mobile Alliance (OMA), 4330 La Jolla Village Dr., Suite 110 San Diego, CA 92122; USA Apr. 26, 2011 (Apr. 26, 2011), pp. 1-14, XP064066718, Retrieved from the Internet: URL:ftp/Public documents/DM/2011/ [retrieved on Apr. 26, 2011] the whole document.

Generic Authentication Architecture (GAA), 3GPP TR 33.919, 3rd Generation Partnership Project (3GPP), V11.0.0, Sep. 2012. See section 7.3.2 especially.

Sachin Agarwal et al:"Operator-based over-the-air M2M wireless sensor network security", Intelligence in Next Generation Networks (ICIN), 2010 14th International Conference on, IEEE, Piscataway, NJ, USA, Oct. 11, 2010 (Oct. 11, 2010), pp. 1-5, XP031805025, ISBN: 978-1-4244-7443-1 Abstract Sections I and IV.

"Lightweight Machine to Machine Technical Specification; OMA-TS-LightweightM2M-V1 0-20131210-C", OMA-TS-LightweightM2M-V1 0-20131210-C, Open Mobile Alliance (OMA), 4330 La Jolla Village Dr., Suite 110 San Diego, CA 92122 ; USAno. 1.0 Dec. 10, 2013 (Dec. 10, 2013), pp. 1-104, XP064175911, Retrieved from the Internet: URL:ftp/Publicdocuments/DM/LightweightM2M /Permanent documents/[retrieved on Dec. 17, 2013] Section 5 and subsections.

Alcatel-Lucent "Presentation of WID Information: Management Interface for M2M 1.0" Sep. 10, 2013, pp. 1-15.

U.S. Appl. No. 15/021,876, Mar. 31, 2017, Office Action.

Office Action issued in U.S. Appl. No. 15/021,888 dated Feb. 27, 2018.

U.S. Appl. No. 15/021,871, filed Mar. 14, 2016, Bone et al.
U.S. Appl. No. 15/021,876, filed Mar. 14, 2016, Bone, Nick.
U.S. Appl. No. 15/021,881, filed Mar. 14, 2016, Bone et al.
U.S. Appl. No. 15/021,885, filed Mar. 14, 2016, Bone et al.
U.S. Appl. No. 15/021,879, filed Mar. 14, 2016, Bone, Nick.
U.S. Appl. No. 15/021,888, filed Mar. 14, 2016, Bone et al.

International Search Report for PCT/GB2014/052766 dated Jan. 23, 2015.

GB Search Report for GB1409641.6 dated Nov. 7, 2014.

3GPP TS 33.220 v12.1.0 "Technical Specification Group Services and System Aspects; Generic Authentication Architecture (GAA); Generic Bootstrapping Architecture (GBA) (Release 12)", Jun. 26, 2013 See in particular sections 4.3.1/2, 4.4.4/9, 4.5.1/2.

3GPP TS 33.223 v11.0.0 "Technical Specification Group Services and System Aspects; Generic Authentication Architecture (GAA); Generic Bootstrapping Architecture (GBA) Push function (Release 11)", Sep. 19, 2012 See in particular sections 4.1, 4.2, 4.3.5/9, 5.1.1.

Ericsson: "GBA for constrained devices", 3GPP Draft; S3-131056 PCR33868 GBACONSTR FIN, 3rd Generation Partnership Project (3GPP), Mobile Competence Centre ; 650, Route Des Lucioles ; F-06921 Sophia-Antipolis Cedex ; France vol. SA WG3, No. San Francisco, US; Nov. 11, 2013-Nov. 15, 2013 Nov. 4, 2013 (Nov. 4, 2013), XP050765950, Retrieved from the Internet: URL:http://www.3gpp.org/ftp/tsg_sa/WG3_Security/TSGS3 73 San Francisco/Docs/ [retrieved Fin Nov. 4, 2013].

GB Search Report for GB1409663.0 dated Nov. 11, 2014.

Further GB Search Report for GB1409663.0 dated May 28, 2015.

Further GB Search Report for GB1409663.0 dated May 29, 2015.

International Search Report for PCT/GB2014/052768 dated Apr. 22, 2015.

Exalted: "WP5—Security, Authentication & Provisioning. Deliverable 5.1 Security and Provisioning Solutions", Feb. 29, 2012 (Feb. 29, 2012), XP055161176, Retrieved from the Internet: URL:http://cordis.europa.eu/docs/projects/ cnect/2/258512/080/deliverables/001-EXALTEDWP5D51.pdf [retrieved on Jan. 12, 2015] Chapter 5.

"3rd Generation Partnership Project; Technical Specification Group Services and System Aspects; Security aspects of Machine-Type Communications; (Release 11)", 3GPP Draft; S3-120774-TR33868-RM, 3rd Generation Partnership Project (3GPP), Mobile Competence Centre ; 650, Route Des Lucioles; F-06921 Sophia-Antipolis Cedex ; France Jul. 13, 2012 (Jul. 13, 2012), XP050685307, Retrieved from the Internet: URL:http://www.3gpp.org/ftp/tsg_sa/WG3_Sec urity/TSGS3_68_Bratislava/Docs/ [retrieved on Jul. 13, 2012] Section 7.2 and subsections.

N. Asokan et al: "Applicability of identity-based cryptography for disruption-tolerant networking", Proceedings of the 1st International MOBISYS Workshop on Mobile Opportunistic Networking, MOBIOPP '07, Jan. 1, 2007 (Jan. 1, 2007), p. 52, XP055181615, New York, New York, USA DOI: 10.1145/1247694.1247705 ISBN: 978-1-59-593688-2 Abstract Section 3 and subsections Figure 2.

"3rd Generation Partnership Project; Technical Specification Group Services and System Aspects; IP Multimedia Subsystem (IMS) media plane security (Release 10)", 3GPP Draft; 33828-A00, 3rd Generation Partnership Project (3GPP), Mobile Competence Centre ; 650, Route Des Lucioles ; F-06921 Sophia-Antipolis Cedex ; France Jun. 29, 2012 (Jun. 29, 2012), XP050905073, Retrieved from the Internet: URL:http://www.3gpp.org/ftp/Specs/2014-12/Rel-10/33 series/[retrieved on Jun. 29, 2012] Section 7.6 and subsections.

"OneM2M-TR-0002—Architecture Analysis Part 1—V-0.2.0 Architecture Analysis—Part 1: Analysis of architectures proposed for consideration by oneM2M", Jul. 28, 2013 (Jul. 28, 2013), XP055154643, Retrieved from the Internet: URL:http://www.onem2m.org/images/files/deliverables/oneM2M-TR-0002-Architecture_Analysis Part 1-VO 2 0.doc [retrievel on Nov. 24, 2014] Section 6, Section 8.

Gemalto: "Corrections and Clarifications in Security text; M2M(12)19 121 CR TS 102 690 R2 Removal of Kma Alignment to CTausi 5 17iith", ETSI Draft; M2M(12)19 121 CR TS 102 690 R2 Removal of Kma Alignment of Clause 5 With_, European Telezmmunicattoo Standards Institute (ETSI), 650, Route Des Lucioles ; F-06921 Sophia-Antipolis; France, vol. SmartM2M, Mar. 22, 2012 (Mar. 22, 2012), pp. 1-32, XP014214112, [retrieved on Mar. 22, 2012] Sections 8.4.4 and 8.5.

"Lightweight Machine to Machine Technical Specification; OMA-TS-Lightweight M2M-V1 0-20130912-D RM", OMA-TS-LightweightM2M-V10-20130912-DRM, Open Mobile Alliance(0MT), 4330 La Jolla Village Dr., Suite 110 San Diego, CA 92122; USA, No. 1.0 Sep. 12, 2013 (Sep. 12, 2013), pp. 1-101, XP064164725, Retrieved from the Internet: URL: ftp/Public documents/DM/ LightweightM2M /Permanent documents/ [retrieved on Sep. 12, 2013]. Section 5.3 and subsections, Section 5.4 and subsections, Section 7 and subsections.

Menezes A J et al, "Handbook of Applied Cryptography", 1997, CRC Press, pp. 22-25, 551-553.

(56) References Cited

OTHER PUBLICATIONS

International Search report for PCT/GB2014/052772 dated Mar. 2, 2015.
GB Search Report for GB1409643.2 dated Oct. 14, 2014.
"3rd Generation Partnership Project; Technical Specification Group Services and System Aspects; Generic Authentication Architecture (GAA); Generic Bootstrapping Architecture (GBA) (Release 11)", 3GPP Standard; 3GPP TS 133.220, 3rd Generation Partnership Project (3GPP), Mobile Competence Centre ; 650, Route Des Lucioles; F-06921 Sophia-Antipolis Cedex ; France, vol. SA WG3, No. V11.4.0, Sep. 19, 2012 (Sep. 19, 2012), pp. 1-92, XP050649223, [retrieved on Sep. 19, 2012] Section 4.
3GPP: "3rd Generation Partnership Project; Technical Specification Group Services and System Aspects; Generic Authentication Architecture (GAA);Generic Bootstrapping Architecture (GBA) Push Function (Release 8)", 3GPP Draft; S3-080605 33223-800, 3rd Generation Partnership Project (3GPP), Mobile Competence Centre ; 650, Route Des Lucioles; F-06921 Sophia-Antipolis Cedex; France, vol. SA WG3, No. Sophia; Jun. 11, 2008, Jun. 11, 2008 (Jun. 11, 2008), XP050280786, [retrieved on Jun. 11, 2008] Section 4.
Cambridge Wireless pdf presentation Apr. 18, 2013 available at: www.cambridgewireless.co.uk/Presentation/CD180413 Amyas Phillips, ARM, Security Sub-Grop chair Cambridge Wireless Connected Devices SIG, Apr. 18, 2013 pdf.
Bhattacharyya et al. "Lightweight mutual authentication for CoAP", Internet Draft, Mar. 3, 2014. Retrieve online Oct. 6, 2016 http://wiki.tools.ietf org/html/draft-bhattacharyya-core-coap-lite-auth-00.
Shelby et al. "OMA Lightweight M2M Tutorial" May 19, 2013 http://www.slideshare.net/zdshelby/oma-lightweightm2m-tutorial.
GB Search report for GB1409652.3 dated Oct. 8, 2014.
International Search Report for PCT/GB2014/052767 dated Jan. 23, 2015.
"OneM2M-TR-0002-ArchitectureAnalysis_Part 1—V-0.2.0 Architecture Analysis—Part 1: Analysis of architectures proposed for consideration by oneM2M", Jul. 28, 2013 (Jul. 28, 2013), XP055154643, Retrieved from the Internet: URL:http://www.onem2m.org/images/files/deliverables/oneM2M-TR-0002-Architecture_Analysis_PartI-V020.doc [retrieved on Nov. 24, 2014] Section 8.1 and subsections.
International Search Report for PCT/GB2014/052771 dated Jan. 23, 2015.
GB Search Report for GB1415003.1 dated Dec. 10, 2014.
"Large Scale Integrating Project EXALTED Expanding LTE for Devices WP4—End-to-End (E2E) M2M System", FP7 Contract No. 258512, Oct. 31, 2012 (Oct. 31, 2012), XP055154391, Retrieved from the Internet: URL:http://www.ict-exalted.eu/fileadmin/documents/EXALTED_WP4D4.3.pdf [retrieved on Nov. 21, 2014] Section 4.2.2.2 and subsections.
Musa Unmehopa: "Management and Provisioning of M2M Devices for a Connected World", ETSI M2M Workshop, Oct. 26, 2011 (Oct. 26, 2011), XP055160332, Retrieved from the Internet: URL:http://docbox.etsi.org/Workshop/2011/201110 M2MWORKSHOP/03M2MCOOPERATION/OMA UN MHOPA.pdf [retrieved on Jan. 7, 2015] Slides 8 and 10.

Nenad Gligoric et al: "Application-layer security mechanism for M2M communication over SMS", Telecommunications Forum (TELFOR), 2012 20th, IEEE, Nov. 20, 2012 (Nov. 20, 2012), pp. 5-8, XP032313672, DOI: 10.1109/Telfor.2012.6419578 ISBN: 978-1-4673-2983-5 Abstract sections I and III.
The Constrained Application Protocol for Pervasive M2M Communications, PERCOM Workshops, 2012 IEEE, Mar. 19-23, 2012, Lugano, pp. 483-485. E-ISBN:978-1-4673-0906-6.
GB Search Report for GB1414997.5 dated Jan. 16, 2015.
GB Search Report for GB1415931.3 dated Mar. 18, 2015.
International Search Report for PCT/GB2014/052786 dated Jan. 23, 2015.
"Large Scale Integrating Project EXALTED Expanding LTE for Devices WP4—End-to-End (E2E) M2M System", FP7 Contract No. 258512, Oct. 31, 2012 (Oct. 31, 2012), XP055154391, Retrieved from the Internet: URL:http://www.ict-exalted.eu/fileadmin/documents/Ecuments/EXALTED WP4 D4.3.pdf [retrieved on Nov. 21, 2014] Chapter 1, Chapter 6.
"OneM2M-TR-0002—Architecture Analysis Part 1—V-0.2.0 Architecture Analysis—Part 1: Analysis of architectures proposed for consideration by oneM2M", Jul. 28, 2013 (Jul. 28, 2013), XP055154643, Retrieved from the Internet: URL:http://www.onem2m.org/images/files/deliverables/oneM2M-TR-0002-Architecture Analysis Part 1—V0 2 0.doc [retrieved on Nov. 24, 2014] Section 6, Section 8.
GB Search Report for GB1414999.1 dated Jan. 13, 2015.
International Search Report for PCT/GB2014/052773 dated Jan. 23, 2015.
Lightweight Machine to Machine Technical Specification; OMA-TS-Lightweight M2M-V1 0-20130912-D RM, OMA-TS-LightweightM2M-V10-20130912-DRM, Open Mobile Alliance (0MT), 4330 La Jolla Village Dr., Suite 110 San Diego, CA 92122; USA, No. 1.0 Sep. 12, 2013 (Sep. 12, 2013), pp. 1-101, XP064164725, Retrieved from the Internet: URL: ftp/Public documents/DM/LightweightM2M /Permanent documents/ [retrieved on Sep. 12, 2013]. Section 5 and subsections.
Office Action issued in U.S. Appl. No. 15/021,885 dated Nov. 3, 2017.
Office Action issued in U.S. Appl. No. 15/021,885 dated May 17, 2018.
Office Action issued in U.S. Appl. No. 15/021,885 dated Jan. 23, 2019.
Meyerstein et al. "Security Aspects of Smart Cards in Machine-to-Machine (M2M) Advanced Mobile Network Applications" Jan. 2009.
Cha "Trust in M2M Communication" IEEE Vehicular Technology Magazine, Sep. 2009.
Office Action issued in U.S. Appl. No. 15/021,888 dated Oct. 2, 2018.
Office Action issued in U.S. Appl. No. 15/021,871 dated Jan. 2, 2019.
Office Action issued in U.S. Appl. No. 15/021,879 dated Jun. 26, 2018.

* cited by examiner

COMMUNICATING WITH A MACHINE TO MACHINE DEVICE

CROSS REFERENCE TO RELATED APPLICATIONS

This application is a U.S. Nationalization of PCT Application Number PCT/GB2014/052766, filed on Sep. 12, 2014, which claims priority to GB Patent Application No. 1409641.6, filed on May 30, 2014, which claims priority to GB Patent Application No. 1318339.7, filed on Oct. 16, 2013, which claims priority to GB Patent Application No. 1316370.4, filed on Sep. 13, 2013, the entireties of which are incorporated herein by reference.

FIELD OF THE INVENTION

The present invention relates to a method and system for communicating with a machine to machine device and in particular for establishing secure communication between a network application function and a machine to machine device.

BACKGROUND OF THE INVENTION

Machine to Machine (M2M) devices are often numerous, hard-to-reach, and have constrained capabilities (owing to low cost, small size, low processing power or limited battery life). All of this makes their management, often remote, very complicated. Moreover, M2M devices often need to be managed in a secure manner. For example, they may contain information that is commercially sensitive and/or confidential for the one or more entities that manage and/or own said devices. There is a need to remotely manage them in a secure way, while respecting these constraints.

The M2M device needs to be able to contact a device management (DM) server in a secure manner. Whilst at the time of manufacture the device may be pre-provisioned with the necessary addresses and URLs to locate this DM server, this requires device suppliers to have knowledge about the device's end users. Furthermore, should the addresses or locations of the DM server change then the M2M devices will require updating to prevent communications from becoming lost or misdirected.

Therefore, there is required a system and method that allows the M2M devices to communicate more reliably and more securely.

In the 3GPP generic bootstrapping architecture (GBA), the M2M device may obtain data from a bootstrapping server function (BSF) so that a shared secret can be established between the M2M device and a network application function (NAF) with which the M2M device is in communication. The shared secret may then be used by the M2M device and the NAF to establish secure communication.

However, this requires configuration of the M2M device to support two interfaces, one between the M2M device and the BSF and the other between the M2M device and the NAF or DM server, which might each utilise different communications protocols, for example CoAP and http. For example, the interface between the M2M device and the BSF may be based on http, which may require a full browser implementation, and the interface between the M2M device and the BSF may be based on CoAP. Configuring the M2M device to support two interfaces, particularly when each interface utilises different protocols, can increase the complexity and cost of the M2M device.

Details of 3GPP Standards and Technologies Used to Implement Aspects of the Method and System One of these architectures of 3GPP is a Generic Authentication Architecture (GAA), which is a complex of standards which is described, for example, in 3GPP TS 33.919 (entitled "3G Security; Generic Authentication Architecture (GAA); System description", currently it may be retrieved at http://www.3gpp.org/ftp/Specs/html-info/33919.htm).

Generic Bootstrapping Architecture (GBA) is a 3GPP standard defined in 3GPP TS 33.220 (entitled "Generic Authentication Architecture (GAA); Generic Bootstrapping Architecture (GBA)", it could be currently retrieved at http://www.3gpp.org/ftp/specs/html-info/33220.htm). GBA is part of the complex of standards called GAA (see above).

GBA is a standard which enables a shared secret to be derived (bootstrapped) from the existing security association between a mobile network and a SIM card. This involves a network element called a Bootstrapping Server Function (BSF). In other words, GBA leverages the security of a SIM card (UICC) to authenticate mobile equipment, and then derive key material for general-purpose applications.

GBA may be advantageously used to provide high-security to the communication between a client and the server, thus allowing remotely managing, controlling and, in general, communicating with a device in a high security manner. In particular, GBA (or a GBA-like architecture) is used for enabling a secure communication with the device (which, according to an aspect of the present disclosure, may be an M2M device), said communication being between a server and a client, the client being associated with the device, and wherein this communication is done for managing the device and/or services provided by (or via) the device, thus enabling a secure management of that device and/or the services provided by (or via) the device. In this way, the device and/or the services provided by (or via) the device can be safely, securely and efficiently managed in a remote manner via a remote server.

GBA has been developed mainly for securing mobile broadcast (e.g. pay TV and equivalents). Indeed, standards for Multimedia Broadcast Multicast Service (MBMS) rely on GBA. Similarly, Open Mobile Alliance (OMA) Mobile Broadcast Services Enabler Suite (BOAST) smartcard profile relies on GBA. To date, most of the limited number of deployments of GBA in the world has been for mobile broadcast. GBA has also been standardised as an optional feature in conjunction with presence services, and within miscellaneous "federated identity" services (e.g. Liberty Alliance, OpenID). In general, it is understood that GBA has been designed for use with mobile devices, such as mobile phones, laptop, computers, and many of the designed features have been provisioned with this in mind.

A variant of GBA, called "GBA Push", has been proposed for securing a message between a client and a DM server in the context of OMA Device Management Security. The OMA Device Management is specifically designed for management of mobile devices such as mobile phones, tablet, computers, etc.

A different recent standard document (TS 102 690) merely mentions, in the context of M2M communications, the use of a standard GBA to secure communications between a device/gateway service layer and a network service layer.

There are some alternatives for identifying/authenticating a mobile user/device to a service. All of these alternatives are simpler than using GBA. For example, mobile operators and service providers can use WAP header enrichment.

Alternatively, the service provider can request the user to enter their phone number, send an SMS one-time password to that phone number, and ask the user to read the SMS and enter the password. These alternatives all work well with mobile devices and operators already, so service providers use them, although they are not as secure as GBA.

Additionally, many service providers prefer to offer services to a huge range of mobile devices, many of which do not contain a SIM card (e.g. PCs, laptops, Wi-fi-only tablets etc.). Since GBA relies on a SIM card/UICC in order to work, there has been no interest in using it.

Strong security is not possible with current alternatives such as a user-entered PIN or a bootstrapping message delivered by an SMS. These alternatives would either not be feasible or they would not provide the required level of security. First, there might not be a user around to enter a PIN (as most M2M devices operate independently from human intervention). Second, the service provider may be likely to want strong security (e.g. because M2M devices may include critical infrastructure), whereas PIN-based bootstrapping has weaker security. Third, if a PIN or SMS-based bootstrapping goes wrong (server connects to wrong client, client connects to wrong server, or there is a Man-In-The-Middle), then the user is likely to notice, complain and get it fixed, whereas an M2M device is unlikely to notice and complain, so may be permanently compromised. Neither is particularly practical by way of existing methods. For example, the OMA Device Management uses GBA Push for securing a message between a client and a DM server, and there is no explanation of how a similar architecture could be used or even modified for managing the device. Moreover, as mentioned above, the OMA Device Management is not compatible for use with an M2M device, as discussed above. This is particularly true for low cost, simple M2M devices, such as simple sensors, switches, low cost trackers etc. Further, the standard document mentioned above uses a standard GBA to secure communications between a device/gateway service layer and a network service layer. Thus, the communication is not used for device/service management-related communications, and it is not clear, based on the observations made above, how a similar architecture could be used or even modified for managing the device from the server. Moreover, for the reasons mentioned above, the OMA Device Management and the standard document are incompatible, and a combination of the GBA Push for OMA Device Management with the standard document is not feasible, as it would result in the wrong device management protocol (i.e. one that is not suitable for M2M devices, particularly simple M2M devices), and some very laborious effort to make the two compatible and delete the elements which are redundant.

The OMA has defined a lightweight protocol for managing (as well as interacting with) M2M devices and managing services provided by M2M devices (e.g. remote control of attached sensors or machines). This protocol is called LWM2M, which is described in detail at http://technical.openmobilealliance.org/Technical/release_program/lightweightM2M_v1_0.a spx This protocol runs over the CoAP protocol (analogous to http)—more specifically CoAP over DTLS (coaps) which is analogous to http over TLS (https). However, coaps requires a secure association to be provisioned between a device and a network server (DM Server) while providing no strong means to provision such an association from scratch.

A security aspect of OMA LWM2M is defined in Lightweight Machine to Machine Technical Specification Candidate Version 1.0—10 Dec. 2013 (OMA-TS-LightweightM2M-V1_0-20131210-C).

In addition, there exists two protocols, the first one called DTLS defined in RFC 6347 (entitled "Datagram Transport Layer Security Version 1.2"; it could be currently retrieved at http://tools.ietf.org/html/rfc6347); the second one called CoAP defined in draft-ietf-core-coap-18 (entitled "Constrained Application Protocol (CoAP)"; it could be currently retrieved at http://datatracker.ietf.org/doc/draft-ietf-core-coap/). Both protocols are currently used in LWM2M. CoAP is still only an IETF draft (not a full RFC), and DTLS version 1.2 is also comparatively new (January 2012): versions of TLS have often existed as RFCs for several years before receiving widespread adoption.

The User Datagram Protocol (UDP) channel security for [COAP] is defined by the Datagram Transport Layer Security (DTLS) [RFC6347], which is the equivalent of TLS v1.2 [RFC5246] for HTTP and utilizes a subset of the Cipher Suites defined in TLS. (Refers to TLS Cipher Suite registry http://www.iana.org/assignments/tls-parameters/tls-parameters.xml) The DTLS binding for CoAP is defined in Section 9 of [CoAP]. DTLS is a long-lived session based security solution for UDP. It provides a secure handshake with session key generation, mutual authentication, data integrity and confidentiality.

The keying material used to secure the exchange of information within a DTLS session may be obtained using one of the bootstrap modes defined in Section 5.1.2 Bootstrap Modes of OMA LWM2M. The formats of the keying material carried in the LWM2M Security Object Instances are defined in Appendix E.1.1.

There also exists an authentication protocol HTTP Digest authentication, which is defined in RFC 3310 (entitled "Hypertext Transfer protocol (HTTP) Digest Authentication using Authentication and Key Agreement (AKA)", it can currently be retrieved at http://www.ietf.org/rfc/rfc3310.txt).

The GAA cluster of specifications TS 33.222 (entitled "Generic Authentication Architecture (GAA); Access to network application functions using Hypertext Transfer Protocol over Transport Layer Security (HTTPS)") defines a general approach for pre-shared key TLS (TLS-PSK, RFC 4279). This can currently be retrieved at http://www.3gpp.org/ftp/Specs/html-info/33222.htm). For example, see especially Section 5.4.

In particular, with reference to GBA, 3GPP Specification TS 33.220 defines the components and interfaces that are shown in FIG. 1. These are further described as:

NAF 122, the "Network Application Function" is a server-side component of an application that will be secured using GBA.

BSF, "Bootstrapping Server Function", 130 is a server-side component, which obtains authentication vectors from the HLR/HSS 140, and sends a challenge to the mobile device, "UE", 110 during the GBA protocol. On successful authentication, it derives the shared secret.

HLR/HSS 140, the "Home Location Register" or "Home Subscriber System", is the existing 3GPP system which stores subscription details and credentials (the K and IMSI) for each SIM card (UICC) issued by a mobile operator. It may be "GBA-aware" (so that it stores details for a GBA user subscription) or may be a legacy component.

UE, the "User Equipment", 110 is a mobile device containing a SIM card (UICC). The UE 110 supports a client application which communicates with the NAF 122, as well as a service which interfaces to the UICC, communicates with the BSF 130, and derives the shared secret before passing it to the client application. This service is (somewhat confusingly) called a "GAA Server" in TR 33.905 (entitled "Recommendations for Trusted Open Platforms", it can currently be retrieved at http://www.3gpp.org/ftp/specs/html-info/33905.htm).

Ua 150 is the interface between the Mobile Device (UE) 110 and the Network Application Function (NAF) 120.

Ub 160 is the interface between the Mobile Device (UE) 110 and the Bootstrapping Server Function (BSF) 130. This is specified in detail in TS 24.109 (entitled "Bootstrapping interface (Ub) 160 and network application function interface (Ua) 150; Protocol details", it can currently be retrieved at http://www.3gpp.org/ftp/Specs/html-info/24109.htm).

Zh/Zh' 180 is the interface between the BSF 130 and the HSS or HLR 140. The Zh 180 interface is used with an HSS 140 that is "GBA Aware". The Zh' 180 interface is used with a legacy HLR or HSS 140. The Zh and Zh' 180 interfaces are specified in detail in TS 29.109 (entitled "Generic Authentication Architecture (GAA); Zh and Zn Interfaces based on Diameter protocol; Stage 3", it can currently be retrieved at http://www.3gpp.org/ftp/Specs/html-info/29109.htm) and TS 29.229 (entitled "Cx and Dx interfaces based on the Diameter protocol; protocol details", it can currently be retrieved at http://www.3gpp.org/ftp/Specs/html-info/29229.htm).

Zn 170 is the interface between the NAF 122 and the BSF 130: this can use either a Web Services protocol (SOAP over http) or the Diameter protocol (RFC 3588). This is specified in detail in TS 29.109 (see above).

There are a few other components and interfaces defined within the GAA standards, but these are not described in detail here.

There are several different versions of GBA defined in the standards. The flavours of GBA may include GBA-ME, GBA-U, GBA-SIM etc. The version called "GBA-ME" may require no special customizations of the UICC, except that the UICC does contain a 3G SIM (a USIM). However, other versions may be used. There may be a need to use the 2G variant of GBA (using a SIM rather than a USIM).

SUMMARY OF THE INVENTION

In a first aspect of the present disclosure, there is provided a bootstrapping server (for example a BSF) for providing a first data object to a machine to machine, M2M, device and a second data object to a network application function, NAF, for establishing secure communication between the M2M device and the NAF, the bootstrapping server being configured to: obtain a third data object; derive the second data object using at least the third data object; obtain the first data object and tunnel the first data object to the M2M device, via an interface between the NAF and the M2M device, for enabling the M2M device to derive first information to establish said secure communication; and provide the second data object to the NAF for enabling the NAF to derive second information to establish said secure communication; wherein the third data object is derived from an existing shared secret, and wherein the existing shared secret is shared between a network data store and the M2M device.

The first data object may comprise, for example, data that enables the M2M device (for example, a user equipment, UE) to derive a shared secret that is shared with the NAF. This data may comprise a RAND (and optionally also an AUTN), which the M2M device can use in the derivation of first information, which may be a new shared secret, such as a Ks_NAF.

At least part of the first data object may be obtained by the bootstrapping server, for example, by obtaining an authentication vector from a Home Location Register (HLR) or Home Subscriber System (HSS). The authentication vector may comprise a random or pseudorandom number (RAND), an authentication token (AUTN), an expected response (XRES), a cipher key (CK) and an integrity key (IK).

The first data object provided to the M2M device may also comprise additional information, such an identifier of a generated key(s) and/or an indicator of the lifetime of the generated key(s). For example, the first data object may also comprise a B-TID or P-TID identifying a Ks and also an indicator of the lifetime of the Ks.

The second data object may comprise, for example, a shared secret, such as a Ks_NAF, that may have been derived by the bootstrapping server, or by any other suitable component. Alternatively, the second data object may comprise data that enables the NAF to derive a new shared secret, for example the second data object may comprise a CK and IK (or a Ks or Kc) and optionally RAND and/or AUTN such that the NAF can derive a shared secret Ks_NAF.

The third data object is derived from an existing shared secret, the existing shared secret being shared between a network data store and the M2M device. For example, the existing shared secret may be a K that is securely stored on a UICC of the M2M device and on a network data store in an HLR/HSS, and the third data object may comprise a CK and IK that are derived from the K.

At least part of the third data object may be obtained by the bootstrapping server, for example, by obtaining an authentication vector from a Home Location Register (HLR) or Home Subscriber System (HSS).

The bootstrapping server may be configured to 'obtain' the first data object by being configured to request the first data object and then receive it, or by simply being configured to receive the first data object without the bootstrapping server having performed any other action (for example, if a different entity requests the first data object on the bootstrapping server's behalf, or if the first data object is merely sent to the bootstrapping server without any request from the bootstrapping server or any other entity etc). Likewise, the same applies in respect of being configured to 'obtain' the third data object.

If the second data object comprises Ks_NAF, the bootstrapping server function may use at least the CK and IK (and optionally also RAND) in the derivation of the Ks_NAF. Alternatively, if the second data object comprises data using which the NAF can derive a Ks_NAF, the second data object may comprise the CK and IK (and optionally also RAND), or a Ks (and optionally also RAND), or a Kc (and optionally also RAND). The third data object may comprise any data using which the second data object can be derived, for example it may comprise CK and IK (and optionally also RAND), or a Ks (and optionally also RAND), or a Kc (and optionally also RAND).

The first data object may be tunnelled to the M2M device via any interface that is not built for carrying the first object, but has been re-purposed to carry the first object. For example, the first data object may be tunnelled through an interface that is to be used for secure communication between the M2M device and the NAF (for example, Ua), or an interface that is used for providing an M2M service or M2M device management (for example, Ua), or any other interface between the NAF and M2M device that is not built for carrying the first object (for example, Ua').

In one example, the data that would otherwise be transmitted via a Ub interface may be tunnelled through Ua or Ua' in order to provide the first data object. In another example, the data that would otherwise be transmitted via a Upa interface may be tunnelled through Ua or Ua' in order to provide the first data object.

Tunnelling, or re-purposing, may be achieved using any suitable commands or parameters in the "host" interface (i.e. the interface through which the other interface is tunnelled). For example, "Write" and/or "Register" and/or "Update" logical expressions in the host interface may be used to carry data (such as the first data object).

By tunneling the first data object, the number of interfaces to the UE may be reduced (for example, it is not necessary to support interfaces Ub or Upa). Furthermore, the need for the UE to support a number of different protocols, for example http and CoAP, may be avoided. Therefore, the configuration and operation of the UE may be simplified. Furthermore, where the M2M device is configured to support multiple interfaces between the M2M device and the NAF, for example Ua and Ua', the M2M device may still be simplified compared with the case where the M2M device also has to support Ub or Upa, at least because each of the interfaces between the M2M device and the NAF may utilise the same protocol, for example CoAP.

The first information may be a shared secret, for example Ks_NAF, and the second information may also be a shared secret, for example Ks_NAF. If the M2M device derives a Ks_NAF that matches the Ks_NAF derived by the NAF, the M2M device and NAF may utilise the Ks_NAF (either directly or indirectly through use of further derived session keys etc.) to establish secure communication. Alternatively, the first information and second information may be different, co-operative keys, for example asymmetric keys, that may together be used to establish secure communications between the NAF and M2M device.

A new shared secret may be derivable using the first data object and the third data object, wherein the first and second information to establish said secure communication is the new shared secret. For example, the new shared secret may be Ks_NAF, wherein the first data object comprises RAND and AUTN and the third data object comprises CK and IK. Having derived Ks_NAF, the NAF and M2M device may establish secure communication using the Ks_NAF, or session keys derived from Ks_NAF.

The bootstrapping server may be configured to derive the new shared secret at least in part by using at least part of the third data object, for example CK and IK (and optionally also at least part of the first data object, for example RAND), wherein the second data object comprises the new shared secret. For example, the bootstrapping server may derive Ks_NAF using at least the third data object, for example CK and IK, or Ks or Kc, as well as an identifier of the M2M device, for example an IMPI, and an identifier of the NAF, for example a NAF_ID (both of which the bootstrapping server may have obtained previously). Optionally, at least part of the first data object, for example RAND, may also be used by the bootstrapping server to derive Ks_NAF.

The second data object may then comprise Ks_NAF, using which the NAF may simply derive the second information, for example by extracting the Ks_NAF from the second data object and optionally deriving a session key(s) from the Ks_NAF. Alternatively, if the bootstrapping server derives Ks_NAF, the second data object may be the same as the second information i.e. both are the Ks_NAF.

The M2M device may likewise derive first information, such as Ks_NAF, using any other required data that it has obtained, for example CK and IK, or Ks or Kc (which may be obtained from a UICC on the M2M device), an identifier of the NAF, such as a NAF-Id (which it may have obtained from the NAF) and an identifier of the M2M device, such as the IMPI. Optionally, at least part of the first data object, for example RAND, may also be used by the M2M device to derive Ks_NAF.

The bootstrapping server may also be configured to: receive, via the interface between the M2M device and the NAF, a tunnelled request for the first data object, the request comprising an identifier of the M2M device; and obtain the third data object from a network data store using the identifier of the M2M device. For example, the identifier of the M2M device may be an IMSI, an IMPI, a TMPI or TMSI. In this way, the M2M device may request the data that it requires to derive the first information without the necessity of a dedicated interface between the M2M device and the bootstrapping server, thereby enabling the M2M device to have a simplified configuration.

The bootstrapping server may also be configured to: generate a transaction identifier (for example, a B-TID); and tunnel the transaction identifier to the M2M device via the interface between the NAF and the M2M device, again thereby avoiding the necessity of a dedicated separate interface between the M2M device and the bootstrapping server.

The bootstrapping server may also be configured to: receive, via the interface between the NAF and the M2M device, a tunnelled authentication data object from the M2M device; and perform an authentication process using the authentication data object and the third data object to determine the authenticity of the M2M device. On successful authentication of the M2M device, the bootstrapping server may tunnel a notification of the successful authentication to the M2M device via the interface between the M2M device and the NAF. The authentication data object may be derived using a RES or SRES, for example the authentication data object may be http digest information (which accompanies an http message body) that is constructed using at least the RES or SRES, which may be used to protect communication between the M2M device and the bootstrapping server via the tunnelled interface This enables communication between the M2M device and the bootstrapping server to be protected without requiring a dedicated separate interface between the M2M device and the bootstrapping server.

The bootstrapping server may be configured to: tunnel the first data object to the M2M device by providing the first data object to the NAF for forwarding to the M2M device using a push message tunnelled via the interface between the M2M device and the NAF.

The bootstrapping server may also be configured to: receive a push information request (for example, a GPI request); generate a push information response (for example a GPI response) comprising the first data object; and provide the push information response to the NAF.

The push information request may comprise an identifier of the M2M device, the bootstrapping server being further configured to: obtain the third data object from the network data store using the identifier of the M2M device.

By providing the push information response to the NAF, the NAF may push to the M2M device any information required for the M2M device to derive a shared secret, such that the M2M device and the NAF may both establish a security association (for example, a NAF_SA) such that secure communications may be established.

The bootstrapping server may also be further configured to: obtain security settings for a subscription of the M2M device using the identifier of the M2M device; and provide the security settings to the NAF. For example, the security settings may be GBA User Security Settings (GUSS) that the bootstrapping server may obtain, for example, from a network element. The GUSS may include application-specific user security settings (USS) related to a particular service or application subscription of the M2M device (for example, a subscription to a particular service or application provided by the NAF). As defined in 3GPP TS 33.220, a USS is an application and subscriber specific parameter set that defines two parts, an authentication part, which contains the list of identities of the user needed for the application (e.g. IMPUs, MSISDN, pseudonyms), and an authorisation part, which contains the user permission flags (e.g. access to application allowed, type of certificates which may be issued). In addition, a USS may contain a key selection indication, which is used in the GBA_U case to mandate the usage of either the ME-based key (Ks_(ext)_NAF) or the UICC-based key (Ks_int_NAF) or both. The USS is delivered to the BSF as a part of GUSS from the HSS, and from the BSF to the NAF if requested by the NAF.

Alternatively, the security settings may be any other form of security settings information that may be obtained by the bootstrapping server from any other suitable device, for example from the bootstrapping server's own records, or some any other network device.

Optionally, the bootstrapping server may be configured to check that the NAF is authorised to receive the push information response.

As explained earlier, tunneling, or re-purposing, may be achieved using any suitable commands or parameters in the "host" interface (i.e. the interface through which the other interface is tunnelled). For example, "Write" and/or "Register" and/or "Update" logical expressions in the host interface may be used to carry data (such as the first data object, the request for the first data object, the transaction identifier, the authentication data object, the notification of successful authentication etc).

There is further provided in the present disclosure a network application function, NAF, for establishing secure communication between the NAF and a machine to machine, M2M, device, the NAF being configured to: receive a first data object; tunnel the first data object to the M2M device, via an interface between the NAF and the M2M device, for enabling the M2M device to derive first information to establish said secure communication; receive a second data object; and derive second information for use in establishing said secure communication with the M2M device.

As explained above, the second information (for example, a shared secret Ks_NAF) derived by the NAF may be used in conjunction with the first information derived by the M2M device (for example, also a shared secret Ks_NAF) in order to establish secure communication between the NAF and the M2M device.

The first data object may be tunnelled to the M2M device via any interface that is not built for carrying the first object, but has been re-purposed to carry the first object. For example, the first data object may be tunnelled through an interface that is to be used for secure communication between the M2M device and the NAF (for example, Ua), or an interface that issued to providing an M2M service or M2M device management (for example, Ua), or any other interface between the NAF and M2M device that is not built for carrying the first object (for example, Ua').

In one example, the data that would otherwise be transmitted via a Ub interface may be tunnelled through Ua or Ua' in order to provide the first data object. In another example, the data that would otherwise be transmitted via a Upa interface may be tunnelled through Ua or Ua' in order to provide the first data object.

Tunnelling, or re-purposing, may be achieved using any suitable commands or parameters in the "host" interface (i.e. the interface through which the other interface is tunnelled). For example, "Write" and/or "Register" and/or "Update" logical expressions in the host interface may be used to carry data (such as the first data object).

By tunneling the first data object, the number of interfaces to the UE may be reduced (for example, it is not necessary to support interfaces Ub or Upa). Furthermore, the need for the UE to support a number of different protocols, for example http and CoAP, may be avoided. Therefore, the configuration and operation of the UE may be simplified. Furthermore, where the M2M device is configured to support multiple interfaces between the M2M device and the NAF, for example Ua and Ua', the M2M device may still be simplified compared with the case where the M2M device supports Ub or Upa, at least because each of the interfaces between the M2M device and the NAF may utilise the same protocol, for example CoAP.

The second data object may comprise a new shared secret (for example, Ks_NAF), wherein the new shared secret is derivable from at least part of a third data object (for example, CK and IK); and wherein at least part of the third data object is derived from an existing shared secret (for example K, from which CK and IK are derived); and wherein the existing shared secret is shared between a network data store and the M2M device. Derivation of the new shared secret may also optionally use at least part of the first data object (for example, RAND).

The NAF may also be configured to: receive, via the interface between the NAF and the M2M device, a tunnelled request for the first data object, the request comprising an identifier of the M2M device; and provide the request for the first data object to a bootstrapping server function.

The NAF may also be further configured to: receive a transaction identifier from a bootstrapping server function; and tunnel the transaction identifier to the M2M device via the interface between the NAF and the M2M device.

The NAF may also be configured to: receive, via the interface between the M2M device and the NAF, a tunnelled authentication data object; and provide the authentication data object to a bootstrapping server function.

The NAF may also be configured to: receive from a bootstrapping server function a notification of successful authentication; and tunnel the notification of successful authentication to the M2M device via the interface between the M2M device and the NAF.

The NAF may be configured to tunnel the first data object to the M2M device via the interface using a push message.

The NAF may also be configured to provide a push information request to a bootstrapping server; receive a push information response comprising the first data object; and tunnel the push information response to the M2M device using a push message via the interface between the NAF and the M2M device. The push information request may comprise an identifier of the M2M device.

By utilising tunneling in the ways described above, the NAF may facilitate the execution of various different functions in the establishment of secure communication such that a dedicated, separate connection between the bootstrapping server and the M2M device is not required, thereby enabling a simplified configuration of the M2M device.

The NAF may be any server or network component that terminates secure communication on an interface between the NAF and the M2M device.

The NAF may be configured as a proxy to sit between the M2M device and a device management server (DM server) and/or as a proxy to sit between the M2M device and a LWM2M server and/or as a proxy to sit between the M2M device and a LWM2M bootstrapping server and/or as a proxy to sit between the M2M device and a bootstrapping server.

The NAF may additionally, or alternatively, be configured as a router to sit between the M2M device and the DM server and/or as a router to sit between the M2M device and a LWM2M server and/or as a router to sit between the M2M device and a LWM2M bootstrapping server and/or as a router to sit between the M2M device and a bootstrapping server. In this way, the NAF may pass any suitable traffic on to the DM server/LWM2M server/LWM2M bootstrapping server/bootstrapping server either encrypted or unencrypted such that the functionality of the server/LWM2M server/LWM2M bootstrapping server/bootstrapping server need not be modified in any way and the server/LWM2M server/LWM2M bootstrapping server/bootstrapping server does not need to be 'GBA aware'.

The present disclosure also provides a device management server (DM server) comprising the NAF of the present disclosure. For example, the NAF may be a plug-in component in the DM server, or the NAF may be the DM server itself (i.e. the NAF is identical to the DM server). The present disclosure also provides a LWM2M server comprising the NAF of the present disclosure. For example, the NAF may be a plug-in component in the LWM2M server, or the NAF may be the LWM2M server itself (i.e. the NAF is identical to the LWM2M server). The present disclosure also provides a LWM2M bootstrapping server comprising the NAF of the present disclosure. For example, the NAF may be a plug-in component in the LWM2M bootstrapping server, or the NAF may be the LWM2M bootstrapping server itself (i.e. the NAF is identical to the LWM2M bootstrapping server). The present disclosure also provides a bootstrapping comprising the NAF of the present disclosure. For example, the NAF may be a plug-in component in the bootstrapping server, or the NAF may be the bootstrapping server itself (i.e. the NAF is identical to the bootstrapping server).

The present disclosure also provides a method for providing a first data object to a machine to machine, M2M, device and a second data object to a network application function, NAF, for establishing secure communication between the M2M device and the NAF, the method comprising the steps of: obtaining a third data object; deriving the second data object using at least the third data object; obtaining the first data object and tunneling the first data object to the M2M device, via an interface between the NAF and the M2M device, for enabling the M2M device to derive first information to establish said secure communication; and providing the second data object to the device management server for enabling the NAF to derive second information to establish said secure communication; wherein the third data object is derived from an existing shared secret, and wherein the existing shared secret is shared between a network data store and the M2M device.

This method may be carried out, for example, using a bootstrapping server, or any other server or network component that is configured to perform the method steps.

The step of 'obtaining' the first data object may comprise requesting the first data object and then receiving it, or simply receiving the first data object without any other action being performed (for example, if a different entity requests the first data object, etc.). Likewise, the same applies in respect of being configured to 'obtain' the third data object.

The method may further comprise the step of establishing secure communication between the M2M device and the NAF using the first information and the second information. For example, the first information and the second information may be a shared secret (Ks_NAF), or session keys derived from a shared secret (Ks_NAF).

The present disclosure also provides a method for establishing secure communication between the NAF and a machine to machine, M2M, device, the method comprising the steps of: receiving a first data object; tunneling the first data object to the M2M device, via an interface between the NAF and the M2M device, for enabling the M2M device to derive first information to establish said secure communication; receiving a second data object; and deriving second information for use in establishing said secure communication with the M2M device.

This method may be carried out, for example, using a network application function (NAF) (which may form at least part of a device management server, or may be a separate component to the device management server), or any other server or network component that is configured to perform the method steps.

The first data object may be tunnelled to the M2M device via any interface that is not built for carrying the first object, but has been re-purposed to carry the first object. For example, the first data object may be tunnelled through an interface that is to be used for secure communication between the M2M device and the NAF (for example, Ua), or an interface that issued to providing an M2M service or M2M device management (for example, Ua), or any other interface between the NAF and M2M device that is not built for carrying the first object (for example, Ua').

In one example, the data that would otherwise be transmitted via a Ub interface may be tunnelled through Ua or Ua' in order to provide the first data object. In another example, the data that would otherwise be transmitted via a Upa interface may be tunnelled through Ua or Ua' in order to provide the first data object.

Tunnelling, or re-purposing, may be achieved using any suitable commands or parameters in the "host" interface (i.e. the interface through which the other interface is tunnelled). For example, "Write" and/or "Register" and/or "Update" logical expressions in the host interface may be used to carry data (such as the first data object).

By tunneling the first data object, the number of interfaces to the UE may be reduced (for example, it is not necessary to support interfaces Ub or Upa). Furthermore, the need for the UE to support a number of different protocols, for example http and CoAP, may be avoided. Therefore, the configuration and operation of the UE may be simplified. Furthermore, where the M2M device is configured to support multiple interfaces between the M2M device and the NAF, for example Ua and Ua', the M2M device may still be simplified compared with the case where the M2M device supports Ub or Upa, at least because each of the interfaces between the M2M device and the NAF may utilise the same protocol, for example CoAP.

The methods may be based on a Generic Authentication Architecture, GAA, in particular on a Generic Bootstrapping Architecture (GBA).

The connection between the M2M device and the NAF may utilise the CoAP protocol or the LWM2M protocol or any other suitable protocol.

The present disclosure also provides a system for establishing secure communication between a machine to machine, M2M, device and a network application function, NAF, the system comprising: an M2M device; a NAF in communication with the M2M device; and a bootstrapping server in communication with the NAF, wherein the bootstrapping server is configured to: obtain a third data object; derive the second data object using at least the third data object; obtain the first data object and tunnel the first data object to the M2M device, via an interface between the NAF and the M2M device, for enabling the M2M device to derive first information to establish said secure communication; and provide the second data object to the NAF for enabling the NAF to derive second information to establish said secure communication; wherein the third data object is derived from an existing shared secret, and wherein the existing shared secret is shared between a network data store and the M2M device.

The bootstrapping server may be configured to 'obtain' the first data object by being configured to request the first data object and then receive it, or by simply being configured to receive the first data object without the bootstrapping server having performed any other action (for example, if a different entity requests the first data object on the bootstrapping server's behalf etc). Likewise, the same applies in respect of being configured to 'obtain' the third data object.

By tunneling the first data object, the number of interfaces to the UE may be reduced (for example, it is not necessary to support interfaces Ub or Upa). Furthermore, the need for the UE to support a number of different protocols, for example http and CoAP, may be avoided. Therefore, the configuration and operation of the UE may be simplified. Furthermore, where the M2M device is configured to support multiple interfaces between the M2M device and the NAF, for example Ua and Ua', the M2M device may still be simplified compared with the case where the M2M device supports Ub or Upa, at least because each of the interfaces between the M2M device and the NAF may utilise the same protocol, for example CoAP.

The methods described above may be implemented as a computer program comprising program instructions to operate a computer. The computer program may be stored on a computer-readable medium.

The computer system may include a processor such as a central processing unit (CPU). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operation system such as UNIX, Windows® or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
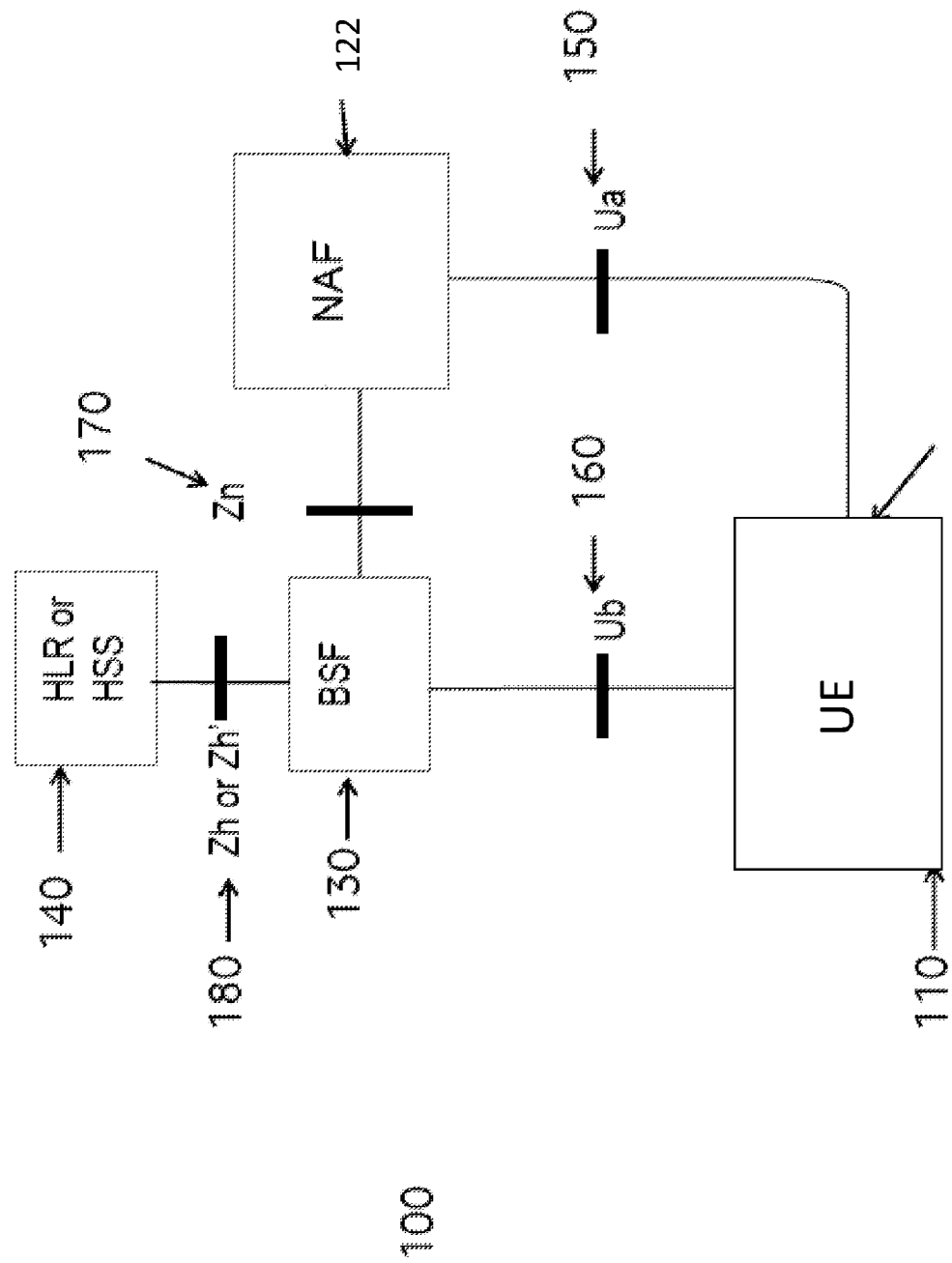
FIG. 1 shows a schematic diagram of components and interfaces with which GBA may be used.

A device may communicate securely with a server. The device may be a Machine to Machine (M2M) device, or an equivalent device (e.g. a device, a generic or specific communication device, including one or more modules capable of providing M2M capabilities).

Aspects of the Generic Authentication Architecture (GAA) and Generic Bootstrapping Architecture (GBA) are identified in "Details of 3GPP standards and technologies used to implement aspects of the method and system" above. In particular, the specific architecture on which the method and system may be based is GBA.

Generic Bootstrapping Architecture (GBA) uses existing security associations between a network (e.g. a mobile network) and a card (e.g. a SIM card or UICC) to derive a key that can be used for the secure communication between the client and the server. Accordingly, if the device is associated with such a card, as well as with the client, the method can advantageously use the GBA to derive the security elements (e.g. a shared secret) to enable the client associated with the device to securely communicate with the server. Accordingly, the device could be advantageously adapted so that it is associated with the card and the client and uses GBA to derive the security elements for secure communication with the server. Moreover, as GBA is standards-based, the impact of the required modifications may be relatively limited and the overall solution would be very attractive (in particular, to M2M users/owners as well as to network operators and/or service providers).

M2M devices are different from the mobile devices that OMA Device Management was originally designed for (such as mobile phones, laptops, computers, as explained in "Details of 3GPP standards and technologies used to implement aspects of the method and system" above), and use of GBA (in any of its versions) with M2M is not a straightforward implementation.

A variant of GBA, called "GBA Push" has been proposed for securing a message between a client and a DM server in the context of OMA Device Management Security, and is identified in "Details of 3GPP standards and technologies used to implement aspects of the method and system" above. It is noted that, although GBA Push and GBA are related, it is not trivial to use GBA in place of GBA Push (and vice versa). This is because these two architectures have some important differences. First, in GBA the device has to contact the BSF in order to request a RAND and AUTN (and use this to derive a Ks_local). To the contrary, in GBA Push, the client does not have to talk to the BSF—it just receives a message prepared by the BSF. Furthermore, in GBA, there is no need to modify the Ua interface. In GBA Push, either the Ua interface has to be modified in some way to carry the push message or a new interface must be added. Accordingly, GBA Push cannot be used with an arbitrary application protocol. For GBA Push, the application protocol has to be "GBA aware" in some sense (e.g. so it can carry the GBA Push Info (GPI) messages). In GBA, the Ks_local can be used to derive several different Ks_NAFs (e.g. for different application servers). In GBA Push, only one NAF can use/rely on the Ks_local. Accordingly, GBA Push is slightly less efficient than GBA.

The GBA Push Info is described in 3GPP TS 33.223, Section 5.2.1. The encoding is defined in Section 5.3.5. See in particular table 5.2.1.1 and figure 5.3.5.1 in 3GPP TS 33.223 V12.0.0 (2013-12) that may be found: http://www.3gpp.org/ftp/Specs/archive/33_series/33.223/33223-c00.zip Moreover, as discussed above, M2M devices are very constrained in their capabilities (e.g. computation, communication, life, etc.) and these constraints make their management more complex and harder to implement in a simple manner. GBA requires a number of interfaces and components which are hard to implement with M2M (for examples and description of these interfaces and components, please refer to the sections below).

In order to more efficiently and securely manage the device and/or services provided by (or via) the device, these interfaces and components need to be modified or otherwise adapted so they can properly and effectively work with M2M devices.

For example, carrying the Ub interface (and associated protocol) over constrained M2M devices is very difficult. For example, the standard Ub interface uses HTTP and HTTP digest. The likely rationale for this is that, as mentioned above, GBA was designed having mobile devices, such as mobile phones, in mind. So, since all phones use HTTP, and therefore all have an HTTP stack, then HTTP was the easiest protocol to be used for the Ub interface. However, this is not true for M2M devices. For example, according to the Lightweight M2M (LWM2M) protocol (see below for more details), a protocol called CoAP is used in M2M devices, precisely because it is a simpler/more efficient alternative to HTTP. Alternatively, this Ub interface could be tunnelled, for example via another interface (e.g. the Ua), so that the system may be simplified.

Additionally, building all the necessary components (e.g. GAA server, interfaces) into a capacity-constrained M2M device appears to be very difficult. For example, physical and virtual space constraints, as well as computational constraints, create considerable problems for building the necessary components. Moreover, having one or more interfaces between M2M application(s) and a card on the device, such as a UICC, is very difficult. This is due, for example, to the fact that most M2M modems do not support the required low level interface(s). In general, the overall integration of the GBA required interfaces and components with an M2M device appear very difficult. A possible, but not optimal solution, could be to pre-provision the M2M devices (e.g. having the M2M devices already designed and/or manufactured with the required components and interfaces) and the associated elements required for use of GBA (e.g. the card being capable of interfacing with the M2M device) so that the GBA could be used. To date, no M2M device is pre-provisioned with these characteristics.

In addition, as noted above, GBA is not widely used. There are other reasons why GBA is not widely used. For example, use of GBA requires support in the device, in the network (e.g. BSF—see below) and by individual services (which may be deployed, for example, by a mobile operator or by other parties). In the preferred use-case (mobile broadcast) support is also required in the SIM card (as it uses GBA-U). Accordingly, a lack of coordination and willingness to act/cooperate between the various parties involved in this deployment (e.g. device manufacturers, mobile operators, service providers) has so far blocked implementation of GBA.

For all the above reasons, GBA (or a GBA-like architecture, for example a variant and/or a suitably modified version) may be used for enabling a secure communication with a device (in particular, an M2M device). The communication may be between a server and a client, the client being associated with the device, and wherein this communication may be done for managing the device and/or services provided by (or via) the device. This enables a secure management of that device and/or the services provided by (or via) the device and creates a new and innovative combination which produces a synergistic effect and provides many technical advantages.

For instance, as already mentioned above, the GBA will provide a higher and very strong level of security to the device/service management-related communications with M2M devices, which is a very critical and important point.

Another advantage, in addition or combined with the strong security described above, is in terms of full automation. Moreover, an M2M service provider does not have the cost/complexity of setting up their own security solutions, as the solution can be provided directly by the mobile operator implementing the solution described in this application. In particular, a service provider does not have to set up a PKI, issue certificates, pre-load keys to devices and so on.

Accordingly, the method may further comprise that the provision of the secure communication is based on a security association between a network and a card, the card being associated with the device. For example, the card may be embedded within the device (e.g. soldered in the device) or provided to the device by way of a suitable connection. In general, the card may be associated in any suitable manner so that there is an association between the card and the device. The network can be a mobile network, or any equivalent network, while the card can be a SIM card, a UICC, or any card associated with the network. The method may further comprise deriving a shared secret based on the security association. The method may further comprise providing the client and the server with the shared secret so as to enable the secure communication. The server may be a server adapted to manage the device (e.g. remotely manage the device, send updates, transfer information to and from the device, control device parameters, etc.) and to manage services provided by the device (e.g. device is used to switch on/off and/or dim streetlights). The shared secret may be a key and/or a similar security arrangement.

The method may further comprise authentication between the client and the server. The authentication may be based on the shared secret. The authentication may be performed via an authentication component. The authentication may be performed by means of a first authentication between the client and an authentication component and of a second authentication between the server and the authentication component. The client and the server may be independently authenticated by an authentication component. As a result of the client and the server being authenticated by the authentication component, both the client and the server may share the shared secret. The authentication may be performed by means of the shared secret. The shared secret may be shared between the client and the server. Alternatively, the shared secret may be shared between the client, the server and the authentication component. The authentication may implicitly result from the client, the server and the authentication component sharing the shared secret. The method may further comprise deriving a second shared secret based on the shared secret, the second shared secret being shared between the client and the server. This second shared secret may then be used for the authentication as discussed above.

The obtainment of the shared secret at the client may be based on an identifier associated with a server authentication component. The shared secret may be obtained at the server from the authentication component. The obtainment of the shared secret at the server is obtained based on an identifier associated with the shared secret. The identifier is generated by the authentication component. The identifier may be provided to the server by the client.

The OMA LWM2M protocol for managing (as well as interacting with) M2M devices and managing services provided by M2M devices (as described in "Details of 3GPP standards and technologies used to implement aspects of the method and system") may be used. However, other device management protocols may be used or the method and system may be extended to other M2M services (for example, securing the delivery of binary SMS).

GBA could be advantageously used in conjunction with LWM2M in order, for example, to establish keys for LWM2M, whilst at the same time LWM2M and the procedures specified therein could be used to transport and/or carry any message and/or communication which relates to GBA. For example, this can be done by using specific tunnels (e.g. Ub) or GBA Push Info (GPI) messages. The use of GBA together with LWM2M creates a new and innovative combination which produces a synergistic effect and provides many technical advantages. For example, it allows addressing many more low-end devices, such as M2M devices. This is due, for example, to the use of a device management protocol which is properly optimized for M2M, rather than one repurposed from the consumer space (e.g. OMA DM v1, TR-069). This optimised protocol can be used to transport GBA messages—avoiding the need for a separate HTTP stack—and to manage GBA parameters (identifiers for device and application, lifetimes, key derivation methods, etc.). Further, when accompanied by appropriate network systems to provide automated routing and discovery (e.g. of LWM2M server and BSF), GBA and LWM2M advantageously combine to eliminate the cost of pre-loading settings and credentials, so facilitating low cost devices. GBA with LWM2M securely supports low-cost devices which are unattended or have no UI, where there is no option for user interaction (such as entry of PIN), and where there is no user who is able to notice and recover from authentication failures (spoof server, spoof client or Man In The Middle), Moreover, GBA works without requiring any public key or certificate processing on the device. This is particularly advantageous on simpler devices, as these devices may have minimal public key support or implementation errors when handling certificates.

Accordingly, the shared secret may be used as a key in the LWM2M standard. Also, the LWM2M standard procedures may be used for transmission and/or reception of any communication used within the GBA.

The shared secret may be used as a key or shared secret within the DTLS protocol (identified in "Details of 3GPP standards and technologies used to implement aspects of the method and system" above), either when the LWM2M is used in conjunction with a DTLS protocol or when the DTLS is used alone or in conjunction with one or more other protocols.

The secure communication may further be a data communication. The data communication may be an SMS-based communication. An SMS binding may be used. The data communication may be a UDP-based communication.

The method may further comprise encrypting a communication over the secure data communication. The encryption may be performed using an Advanced Encryption Standard. The SMS-based communication may be further secured by use of an Over-The-Air (OTA) protocol, e.g. a Secured Packet Structure for UICC Applications. This protocol is defined in ETSI standard 102.225. The OTA protocol may be arranged to secure the communication with the identification card associated with the device.

It has also been noted that the OTA protocol can be used advantageously in conjunction with the LWM2M standard, in which the LWM2M can be used to manage parameters, keys and similar elements for the OTA protocol.

The use of OTA with LWM2M is not a straightforward implementation. OTA is a solution designed for SIM card security, as it has some real technical challenges if used for LWM2M. In particular, while there is software written for SIM cards and SIM OTA servers to support ETSI standard 102.225, a similar software does not exist in the device management space for devices (and, in particular, not for OMA DM clients and servers). Thus, M2M device manufacturers do not have a code-base that they can easily adapt for use with these devices.

Further, the ETSI standard 102.225 does not explain how to set up the keys and parameters for use with the standard. It simply assumes the keys and parameters are all pre-loaded and known to both SIM card and OTA server. Although this assumption is acceptable in the SIM space—because SIM cards can be securely provisioned with the necessary keys at the manufacturing stage, and SIM manufacturers have interfaces with operators for communicating the necessary keys and parameters—the same cannot be said about LWM2M, where that infrastructure does not exist.

Thus, the use of OTA together with LWM2M creates a new and innovative combination which produces a synergistic effect and provides many technical advantages. For example, the SMS bearer needs to be secured, and so far no solution has been found. Use of OTA enables the SMS bearer to be used in LWM2M. Without it, it would not be possible to use SMS-based communications in LWM2M, and that would limit the applicability of the overall LWM2M standard.

Accordingly, the LWM2M standard procedures may be used to manage parameters and/or keys used in the OTA protocol. The method may further be used in conjunction with LWM2M, as described above.

It has also been noted that the method described above, implemented using the GBA (or a similar architecture), can be used in conjunction with SMS so that the GBA can be employed to establish keys for secure SMS-based communications (e.g. SMS), while at the same time SMS-based communications can be used to transport or carry messages associated with GBA—for example, carry GBA Push Info (GPI) messages. The use of SMS-based communications together with GBA creates a new and innovative combination which produces a synergistic effect and provides many technical advantages. For example, GBA can be used to establish the shared keys that are needed to protect SMS, while using SMS as a transport to deliver the necessary GBA messages. Further the SMS used to deliver the GBA messages can themselves be integrity protected (and partly encrypted) using the keys that will be established by GBA, so at no point is there a reliance on not secure SMS. This synergistic combination allow use of SMS as the sole bearer for M2M traffic, something which would not otherwise be possible, except by preloading the keys needed to secure SMS traffic, or switching to a different protocol to negotiate these keys: both of these alternatives would add complexity and cost. Thus, it would provide a very high security solution for obtaining shared keys so that the security of the keys is not compromised, and at the same time an-SMS-based communication is enabled by virtue of the provisioning of the keys.

Accordingly, when the method is implemented using GBA, the GBA may be used to establish keys for secure transmission and/or delivery of SMS. SMS-based communications may be used for transmission and/or reception of any communication used within the GBA, noting that these communications may themselves be protected using the keys that will be derived in GBA.

In addition to the above, the server may further comprise a server authentication component. Also, the client may further comprise a client authentication component. The server authentication component may perform authentication of the server with the authentication component. The client authentication component may perform authentication of the client with the authentication component.

Further, the authentication component may be a Bootstrapping Server Function (BSF), the server authentication component may be a Network Application Function (NAF) and the client authentication component may be a GAA Server.

The method may further comprise communicating between the server and the client for determining security parameters to be used for the secure communication, wherein the communicating is performed by using a device management protocol (for example, the GBA). The secure communication may be for use in the device management protocol.

In a further embodiment, there is provided a method of enabling secure communication for use in a device and/or service/application management protocol, the secure communication being between a server and a client, the client being associated with a device, the secure communication requiring security parameters to be agreed between the client and server, the method comprising communicating between the server and client to agree the security parameters, wherein the communicating is performed by using the device management protocol. The device can be an M2M device.

In a further embodiment, there is provided an apparatus, system, module or network for enabling secure communication with a device, said communication being between a server and a client, the client being associated with the device. In addition, the apparatus, system, module or network may further include means for performing any one of the steps or features of the methods described above. The device can be an M2M device.

In a further embodiment, there is provided an apparatus, system, module or network for enabling secure communication for use in a device and/or service/application management protocol, the secure communication being between a server and a client, the client being associated with a device, the secure communication requiring security parameters to be agreed between the client and server, the method comprising communicating between the server and client to agree the security parameters, wherein the communicating is performed by using the device management protocol. In addition, the apparatus, system, module or network may further include means for performing any one of the steps or features of the methods described above. The device can be an M2M device.

In a further embodiment, there is provided a client including any means, features or functionalities corresponding to the means, features or functionalities relative to the client as recited by any one of the methods described above.

In a further embodiment, there is provided a server including any means, features or functionalities corresponding to the means, features or functionalities relative to the server as recited by any one of the methods described above.

In a further embodiment, there is provided a device comprising a card and a client, wherein the device is arranged for enablement of secure communication, the secure communication being between a server and the client, wherein the provision of the secure communication is based on a security association between a network and the card. The client may comprise any means, features or functionalities corresponding to the means, features or functionalities relative to the client as recited by any one of the methods described above. The device can be an M2M device.

In a further embodiment, there is provided a server arranged for enablement of secure communication with a device, the secure communication being between the server and a client associated with the device, wherein the provision of the secure communication is based on a security association between a network and a card, the card being associated with the device. The server may comprise any means, features or functionalities corresponding to the means, features or functionalities relative to the server as recited by any one of the methods described above. The device can be an M2M device.

In a further embodiment, there is provided a system for enabling secure communication with a device, said communication being between a server and a client, the client being associated with the device, wherein the provision of the secure communication is based on a security association between a network and a card, the card being associated with the device. The device can be an M2M device.

In a further embodiment, there is provided a method of enabling secure data communication with a device, the communication being between a server and a client associated with the device, wherein the security of the communication is enabled by a bootstrapped secret. The device can be an M2M device. The security protocol may be used to secure the data communication. The bootstrapped secret may be used to obtain the security elements used for the secure protocol. The bootstrapped secret may be a pre-shared secret, said secret being directly provided to the server and the client. The pre-shared secret may be permanently provided to the server and the client (e.g. by pre-provisioning the client and/or the server with said pre-shared secret, e.g. at manufacturing stage or before the client and/or server are used in a system). The pre-shared secret may be a strong, high entropy or a temporary, low-entropy pre-shared secret. The bootstrapped secret may be based on a public key or a certificate-based method. The bootstrapped secret may be provided via a bootstrap server. The security elements can be keys and/or similar arrangements well known in the art.

The communication may be an SMS-based communication. The security protocol is defined by ETSI TS 102.225. The method may use SMS binding. The device may be further associated with a card, and the security of the data communication may be controlled by means of the card. Any incoming SMS-based communication may be decrypted and/or checked by means of the card, and/or any outgoing SMS-based communication may be encrypted and/or checked by means of the card.

The communication may be a UDP-based communication. The security protocol may be a DTLS protocol.

The secure data communication may be provided over a communication interface. The communication interface may be used for managing the device of for managing the bootstrapping operations.

The data communication may be performed according to the LWM2M protocol.

In a further embodiment, there is provided an apparatus, system, module or network for enabling secure data communication with a device, the communication being between a server and a client associated with the device, wherein the security of the communication is enabled by a bootstrapped secret. The device can be an M2M device.

In a further embodiment, there is provided a method of retrieving security elements required for enabling secure data communication with a device, the communication being between a server and a client associated with the device, wherein the security elements are retrieved using a bootstrapping protocol. The device can be an M2M device. The bootstrapping protocol may retrieve the security elements in a secure session. The session may be secured based on a security protocol. The security protocol may be a DTLS protocol. The bootstrapping protocol may be based on GBA. The data communication may be an SMS-based communication. The bootstrapping protocol may be a LWM2M bootstrap protocol. The security elements can be keys and/or similar arrangements well known in the art.

In a further embodiment, there is provided an apparatus, system, module or network for enabling secure data communication with a device, the communication being between a server and a client associated with the device, wherein the security elements are retrieved using a bootstrapping protocol. The device can be an M2M device.

The secure communication may be for the purpose of managing the device and/or the client and/or services (e.g. provided by the device) by the server. Both the device and the server may be machines (i.e. not requiring any human intervention to work). When the device is a machine, the server may be used to manage it. Again, the management may be done without any human intervention (e.g. automatically).

As discussed above, the solution could be used in conjunction with the LWM2M protocol, but the solution could be extended to other Device Management protocols, or to other M2M services (e.g. securing delivery of binary SMS). In particular, and as discussed above, the use of the solution in conjunction with an M2M-specific protocol, such as LWM2M, allows the solution to be very efficient when used with M2M devices, and in particular, when used to manage the device and/or services provided by (or via) the device. In other words, all the advantages mentioned above are further enhanced and optimised when the solution is used in conjunction with an M2M-specific protocol.

In addition, there is also provided any aspects or combination of aspects according to any one of the claims.

Any combination of the features described in connection with any of the aspects is also provided, even if not explicitly disclosed.

Figure 2:
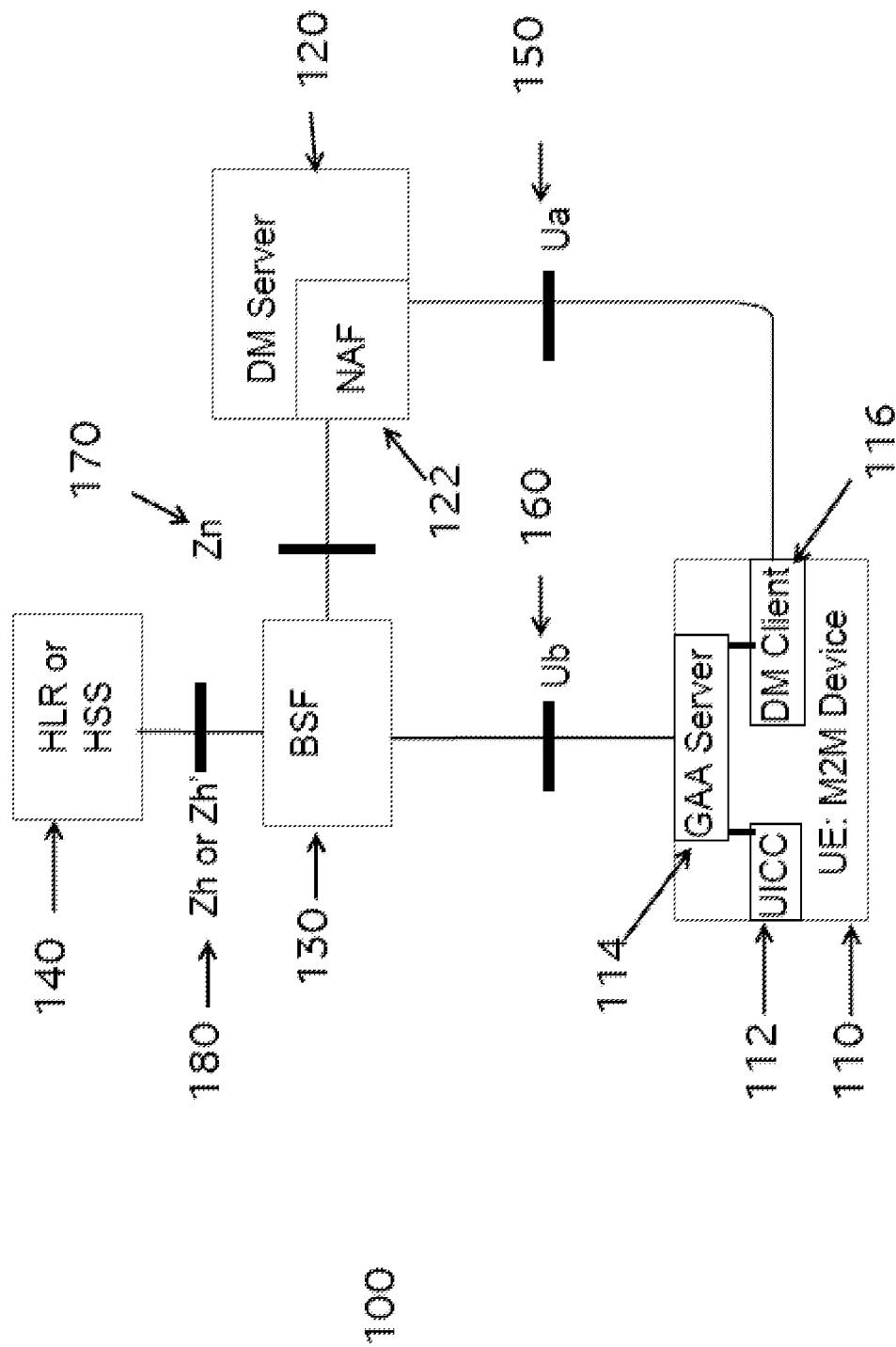
FIG. 2 shows a schematic diagram of an example of an architecture that can be used in accordance with the present invention, in particular when GBA is used.

With reference to FIG. 2, an exemplary architecture (100) is shown that may be implemented, in particular when GBA is used. A device 110 (in the example, an M2M Device and/or a User Equipment) is associated with a card 112 (in the example, a UICC) and a Client 116 (in the example, a Device Management (DM) client. Note that this client could also be an LWM2M Client, namely a client that can manage the device itself and service/applications provided by the device e.g. asset control). The device 110 is also associated with a device authentication component 114 (in the example, a GAA server). Further, a server 120 is provided (in the example, a DM server), the server associated with a server authentication component 122 (in the example, a Network Application Function (NAF)). Further, an authentication component 130 is provided (in the example, a Bootstrapping Server Function (BSF)) and a register 140 (in the example, an HLR or HSS). Also, four different interfaces are provided for communication between the various components, in particular interface Ua 150 between device 110 and server 120, interface Ub 160 between device 110 and authentication component 130, interface Zn 170 between authentication component 130 and server 120, and interface Zh/Zh' between authentication component 130 and register 140.

In particular, with reference to GBA, document TS 33.220 defines the following components and interfaces, which are shown on FIG. 2. NAF, the "Network Application Function", is a server-side component of an application that may be secured using GBA. In a preferred embodiment, the NAF may be a software component within a Device Management (DM) Server.

Some aspects of a BSF, HLR/HSS, UE, Ua, Ub, Zh/Zh' and Zn are provided in "Details of 3GPP standards and technologies used to implement aspects of the method and system" above.

On successful authentication of the device 110, the BSF 130 derives the shared secret Ks_NAF, which is retrieved by the NAF. In a preferred embodiment, the BSF 130 would most likely be on a separate server from the HLR/HSS 140, but within an M2M platform cluster.

The HLR/HSS may be "GBA-aware" (so that it stores details for a GBA user subscription) or may be a legacy component. In a preferred embodiment, the HLR/HSS would be the HLR or HSS of an M2M mobile operator (i.e. one dedicated specifically to serving M2M connections).

The UE 110 is, in the proposed solution, an M2M device.

In a preferred embodiment, the Ua is the interface between a Device Management client 116 and Device Management server 120.

In a preferred embodiment, the Ub would be the interface between the "GAA Server" component 114 of the device and the BSF 130.

In a preferred embodiment, the Zn interface is used.

In the proposed solution, this interface is between the Device Management Server 120 and the BSF 130. The WS version of the interface would allow placement of a DM Server in multiple locations (not just in the M2M operator/platform cluster), and allow future NAFs in multiple locations.

Figure 3:
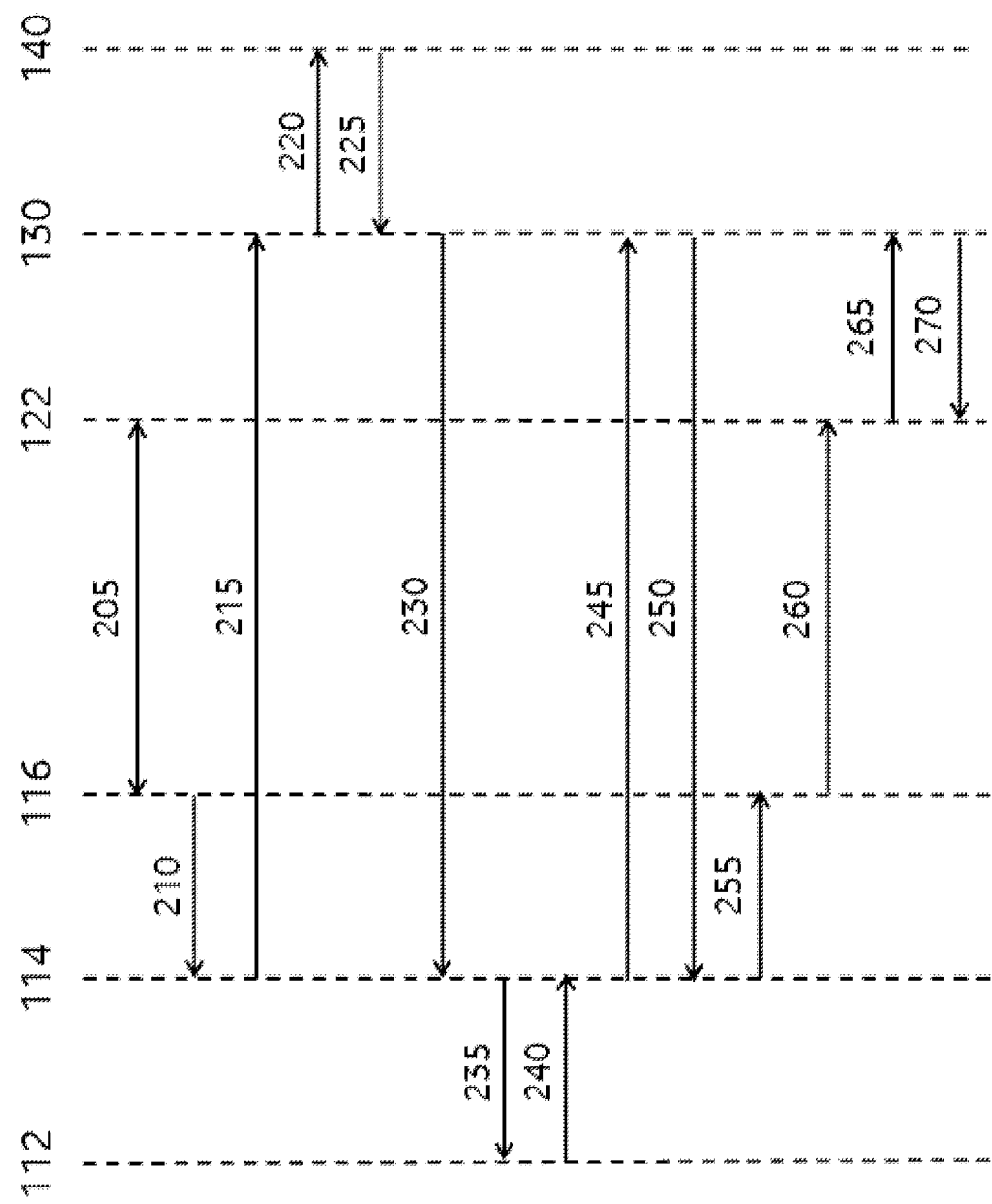
FIG. 3 shows an exemplary flow diagram of communications exchanged within the exemplary architecture of FIG. 2.

With reference to FIG. 3, the procedure for setting up the secure communication in accordance with the present invention is now described, in particular when GBA is used.

At 205, the UE 110 contacts over interface Ua the NAF 122 (in the described embodiment, the Device Management client 116 contacts the Device Management server 122) and discovers that the NAF requires it to acquire a shared secret using GBA. This could be because there is no existing secret, or the existing secret has expired, or is otherwise considered invalid by the NAF.

The exact interface and communication method may be specific to the application concerned. One possible interface and communication method for OMA Lightweight M2M is discussed below.

Over the internal UE interface from DM client to GAA server: at 210, the DM client 116 requests the GAA server 114 to obtain a shared secret. It presents an identifier for the corresponding NAF (NAF_Id).

Over the Ub Interface: at 215, The UE 110 contacts the BSF (GAA Server 114 contacts the BSF 130). This may be a basic http GET request. The UE presents an "IMPI" (equivalent of an IMSI) or a "TMPI" (equivalent of a TMSI) for anonymity reasons, if one is available.

Over the Zh or Zh' Interface: at 220, the BSF 130 requests an authentication vector from the HLR/HSS 140. At 225, the HLR/HSS 140 returns a fresh vector, consisting of a RAND, AUTN, XRES, CK, and IK, for example.

The BSF 130 generates a transaction identifier (B-TID) and passes (230) the B-TID together with the RAND and AUTN back to the UE 110. It may also indicate the lifetime of the B-TID, and the associated key.

Over the internal UE interface from the GAA Server to the UICC: at 235, the GAA Server 114 forwards the RAND and AUTN to the UICC 112 which validates the AUTN. If the AUTN is valid, then the BSF 130 is authenticated. At 240, the UICC 112 returns a RES, CK and IK to the GAA Server 114.

At 245, the UE 110 (GAA Server 114) contacts the BSF 130 again, using the resulting RES for HTTP Digest authentication (which is identified in "Details of 3GPP standards and technologies used to implement aspects of the method and system" above).

The BSF 130 verifies the HTTP Digest using the XRES. If it matches, then the UE 110 has been successfully authenticated. The BSF 130 stores the tuple <IMPI, B-TID, RAND, CK, IK> and tells at 250 the UE 110 that the authentication was successful. The UE 110 stores <B-TID, RAND, CK, IK>.

Over the internal UE 110 interface from DM client 116 to GAA server 114: the UE 110 (GAA Server 114) derives a secret Ks_NAF using the CK, IK, RAND, IMPI and NAF_Id. At 255, it passes Ks_NAF and the B-TID back to the DM client 116.

Over the Ua interface again: at 260, the UE 110 (DM Client 116) contacts the NAF (DM Server 122) and presents the B-TID as retrieved above.

Over the Zn Interface: at 265, the NAF 122 contacts the BSF 130, and presents the BTID. The BSF 130 authenticates the NAF, derives the corresponding Ks_NAF, and at 270 returns it to the NAF, together with an indicator of key lifetime.

The UE 110 (DM Client 116) and NAF (DM Server 122) now both share Ks_NAF. They can use it directly, or to derive their own session keys for further communication.

Again, the exact interface and communication method may be specific to the application concerned. One possible interface and communication method for OMA Lightweight M2M is discussed below.

As discussed above, the solution could be used in conjunction with the LWM2M standard. This standard can be viewed as a successor to existing OMA Device management standards (OMA DM 1.0 to 1.3), but heavily optimized for low end machine-type devices, and with an extended management scope beyond the device itself including the management of services provided by the M2M device such as asset control. This contrasts for instance with OMA DM 2.0 which is the successor for consumer devices like smartphones, tablets etc. Other widely-used Device Management standards include TR-069, which was developed by the Broadband Forum for managing Customer Premises Equipment (in particular DSL modems).

The exemplary flow described with reference to FIG. 3 is very generic, and can be used with many different sorts of device management protocols (or other application protocols). As can be seen, many details of the Ua interface are outside the scope of 3GPP and are left to other standards to complete (or left to proprietary implementations). However, integration with the LWM2M standard is possible, as described in these examples.

Under the specification (see above), the security for OMA LWM2M is based on DTLS v1.2 (see above) and CoAP (see above). Both the client and server must support pre-shared key DTLS (e.g. see section 7.1.1, page 41), whereas support for certificate-based authentication is only optional. This means that a key derived by GBA (Ks_NAF) could be used as a DTLS pre-shared key and it would work with any DM client/DM server pair.

The general approach for pre-shared key TLS is referenced in "Details of 3GPP standards and technologies used to implement aspects of the method and system" above. The GBA and TLS-PSK protocols work well together. In 205 described above, the "Server Hello" message contains a field where the server can indicate that it supports GBA-bootstrapping, and in response, the client can then provide an identifier (B-TID) for an already bootstrapped key (260). Or if the client doesn't already have a bootstrapped key, it asks the GAA server to get one, before resuming the "Client Hello" and "Server Hello" at 260. The use of the Ks_NAF to derive session keys is then specified entirely within the TLS-PSK protocol. The 3GPP spec assumes HTTP/TLS, but the basic approach looks the same for CoAP/DTLS.

To improve consistency with the OMA profile of GBA, the LWM2M spec may need to define a "protocol identifier" for DTLS pre-shared key and have it registered by OMNA (see section 5.2.1 of OMA GBA Profile, Approved Version 1.1—31 Jul. 2012 found at http://technical.openmobilealliance.org/Techncal/release_program/sec_cf_archive.aspx).

Aside from GBA aspects, the M2M device may be configured to support the security of OMA LWM2M, which is referenced in "Details of 3GPP standards and technologies used to implement aspects of the method and system" above.

Additional Aspects
1. Device Development for GBA

As can be seen from FIG. 2 and FIG. 3, the M2M device may contain several internal components. It should support a DM client which is "GBA aware", as well as a "GAA Server" component.

The GAA Server component should support internal interfaces to the DM client and to the SIM card (UICC) as well as the external Ub interface to the BSF. The interface to the UICC may be particularly challenging, as the M2M device may not expose an existing API to allow device software to send commands to the UICC. One possibility (that may be used) is for the modem to expose AT commands. However, this may not be at a sufficiently low level (AT+CSIM allows raw APDUs to be communicated to the UICC) in every case. Further, there may be security issues: while the GAA Server must be able to interface to the UICC, general applications installed on the device should not be able to use this interface, as that could allow external parties to impersonate the device (and engender fraud on the cellular network). So the API to the SIM Card should be privileged, as well as being sufficiently low level to be usable.

2. Ub Tunnelling, or GBA Push

The interface to the BSF is based on http and HTTP Digest authentication. One alternative may be "tunneling" the Ub interface within the Ua interface, so that the device only needs to support the CoAP protocol (not HTTP as well).

A related alternative is using the GBA "Push" variant, and carrying push messages (Upa interface) within the Ua interface. Both of these would require identifying suitable commands and parameters in the Ua interface (i.e. the relevant Device Management protocol) to carry the tunnel or push messages. The interfaces and message flow for GBA push are outlined below (see also 3GPP TS 33.223, entitled "3G Security; Generic Authentication Architecture (GAA); Generic Bootstrapping Architecture (GBA) Push function", it can currently be retrieved by http://www.3gpp.org/ftp/Specs/html-info/33223.htm).

Figure 4:
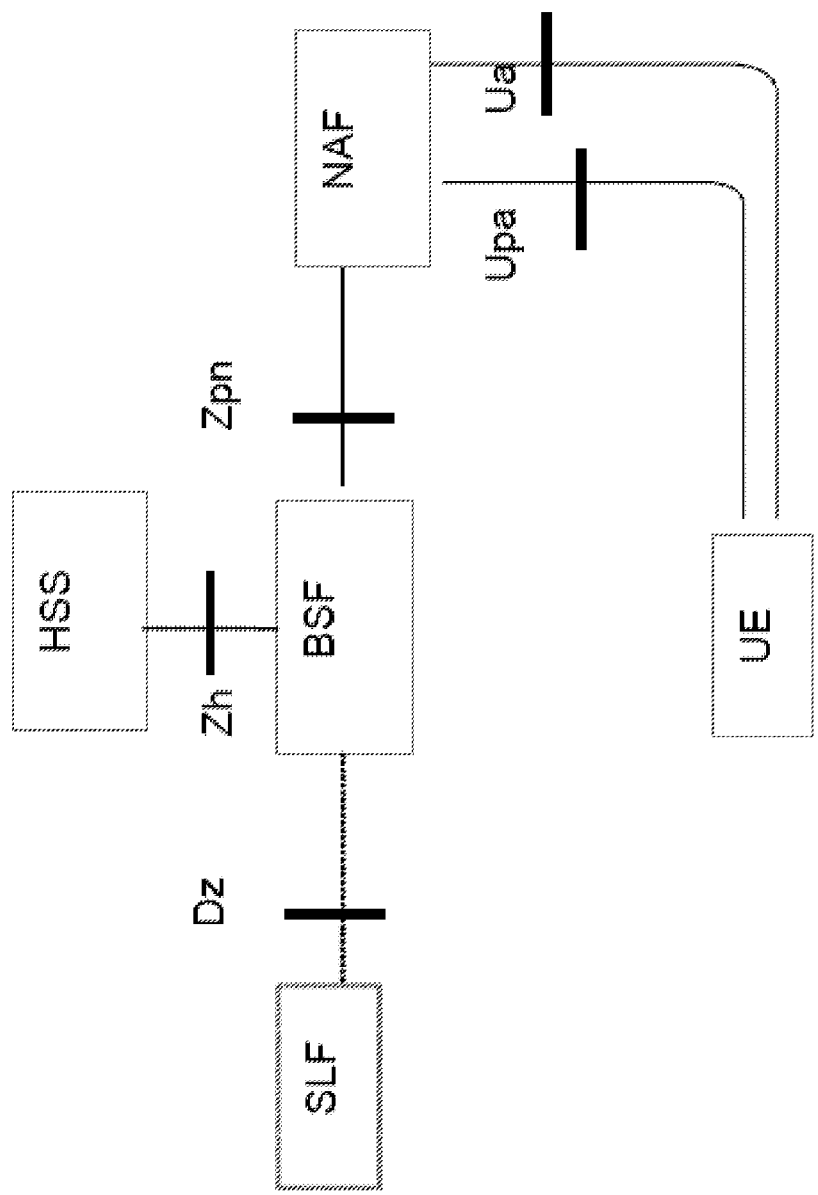
FIG. 4 shows a schematic diagram of an example of an alternative architecture that can be used in accordance with the present invention, in particular when generic bootstrapping architecture (GBA) is used.

With reference to FIG. 4, an example Processing and message flow for GBA Push follows:

1. A NAF establishes a shared NAF_SA with a UE which is registered for Push services. It knows the identity of the subscriber.
2. The Push-NAF generates the GPI (GBA Push info) Request and sends the GPI Request to the BSF.
3. Upon receiving the request from the NAF, the BSF checks that the NAF is authorized, and resolves the requested subscriber identifier to a private identifier (e.g. IMSI).
4. The BSF fetches a new AV (authentication vector) and subscriber's GUSS (GBA User Security Settings) from the HSS.
5. The HSS sends the AV and the GUSS to the BSF.
6. When the BSF receives the AV Response from the HSS, it generates the NAF keys based on the requested NAF_Id and creates the relevant GPI Response.
7. The BSF sends the GPI Response to the NAF.
8. The NAF stores the received information together with other user information in a NAF_SA.
9. The NAF then forwards the GPI to the UE over Upa using the selected transport mechanism and the given transport address.
10. When the UE receives the message containing the GPI, it processes the GPI as for regular GBA, and stores the corresponding NAF_SA(s)

The UE and NAF are now ready to use the established NAF_SA.

TR33.223 specifies that Upa is a new interface that is separate from Ua—"a new reference point Upa is introduced between the NAF and the UE" (Section 4.2.1). As such, the Ua interface should be unaware of whether GBA or GBA-push is being used.

3. Provisioning the Address of the BSF and the NAF

The address of the BSF (http URL) may be pre-loaded when the device is manufactured. It could be device managed itself, which would seem to create a "chicken-and-egg" problem, but the DM Server could, for instance, provide an address for an acceptable BSF in the ServerHello. Or http traffic might be routed by the M2M mobile operator to a default BSF address. Similarly, the location of the preferred DM Server might need to be pre-loaded, or the M2M mobile operator could route CoAP traffic to a default DM Server address.

4. Flavour of GBA (GBA-ME, GBA-U, GBA-SIM Etc.)

Several different versions of GBA are referenced in "Details of 3GPP standards and technologies used to implement aspects of the method and system". GBA-U has security advantages, but also logistic advantages: it permits a longer lifetime for the B-TID as the derived key is stored more securely. It allows safe retention of Ks during power-off cycles for instance. GBA-U requires specific support from the UICC, so would have a (modest) increment to the cost. Since M2M devices are typically provided with a new UICC anyway at manufacture, it is a software/development cost rather than a hardware cost. Also, in a model with a customised UICC, this may allow for a solution using restricted AT commands to the modem, rather than full AT+CSIM.

5. Location of the NAF (DM Server) and Type of Zn Interface

The architecture example allows for there to be several DM Servers in different locations: it could be part of an M2M platform (e.g. M2M mobile operator) cluster, or hosted elsewhere by a network operator/service provider, or perhaps by a customer of said operator/provider. The BSF may need to be located within a firewalled Demilitarized Zone (DMZ), or perhaps connected via an http proxy in the DMZ (so allowing external http Web Service access from NAFs), and then would execute the Diameter interface to the HLR/HSS. It may be undesirable to expose an http interface directly onto the server supporting the HLR, or to tunnel Diameter through firewalls. However, if the DM Server is itself part of the M2M platform cluster then this may be over-engineering. Possibly, a Diameter solution for the Zn interface then becomes acceptable.

6. Use of Zh or Zh' Interface

Ideally, the HLR may be upgraded to a full HSS with support for the Zh reference point. However, if the HLR/HSS only supports Zh' then the BSF will need to be more complicated, and take on some of the subscription management functions (profiling, lifetime, security policies) typically associated with the HSS.

7. Development of NAF Component

While the NAF functionality looks fairly straightforward, it will need to be developed for each DM Server used, and for each additional application which uses GBA.

GBA keys could be used to protect SMS (e.g. encrypt/integrity protect SMS using a secure packet interface e.g. like ETSI TS 102.225 which is used for SIM OTA). This SMS channel is likely to be more efficient than DTLS.

In addition, regardless of GBA, a secure SMS protocol could be linked to a Device and/or Service management protocol, namely: using a secure SMS protocol (e.g. originally designed for SIM OTA (102 225)), but now adapted for LWM2M communications, combined with using the LWM2M protocol to define (and manage) the necessary parameters for the secure SMS protocol (i.e. the relevant Klc, KID, SPI, TAR, and keys). GBA could be used to securely derive the keys.

Further aspects and advantageous or preferable features are described in the following paragraphs.

LWM2M needs a security solution for the SMS bearer. Without a solution, SMS will not be usable as a bearer, severely limiting scope of LWM2M. A solution to this problem is to use SIM OTA security (e.g. see TS 102 225).

TS 102.225 relies on the keys and parameters being already agreed between client and server. However, it is difficult to pre-load these into LWM2M client devices, and ensure that they are sent to servers, because there is no present infrastructure for doing so. It would be pointless to deliver the keys and parameters over unsecured SMS.

There are various proposed solutions for delivering these keys and parameters in a secure way.

In a first solution, there is provided switching bearer to UDP/Coap and running DTLS. The DTLS session can be used to secure the LWM2M Bootstrap protocol. The LWM2M Bootstrap can be used to set the TS 102.225 keys and parameters securely. Note that managed resources/objects need to be defined to allow the Bootstrap server to update them; the format of these resources is specified in the numbered paragraphs below.

In a second solution, there is provided relying on a SIM card (UICC) which has already having been provisioned with keys and parameters, and using this card to terminate TS 102 225 security. Please note that, because this solution provides a secure channel, the same channel can be used to deliver other keys and parameters.

In a third solution, there is provided use of GBA to set up the keys and parameters. This works because the GPI (GBA Push Info) can be delivered over unsecured SMS. So, there is no requirement to have an initial key to protect the SMS. (Note that the delivery of the parameters like Kic, KID, SPI and TAR is not obvious, but these are only 6 bytes, and there are fields in the GPI e.g. App_Lbl, NAF_Id, P-TID which could be used to carry this info.)

Further details are provided in the numbered paragraphs below.

UDP channel security for [COAP] is referenced in "Details of 3GPP standards and technologies used to implement aspects of the method and system" above.

Since the LWM2M protocol utilizes DTLS for authentication, data integrity and confidentiality purposes, the LWM2M Client and LWM2M Server SHOULD keep a DTLS session in use for as long a period as can be safely achieved without risking compromise to the session keys and counters. If a session persists across sleep cycles, encrypted and integrity-protected storage SHOULD be used for the session keys and counters.

Note that the Client-Server relationship of DTLS (i.e. who initiated the handshake) is separate from the Client-Server relationship of LWM2M.

Considering that any device with a LWM2M Client can be managed by any LWM2M Server and LWM2M Bootstrap Server the choice of Cipher Suites is not limited to the list defined in Section 9 of [CoAP]. Due to the sensitive nature of Bootstrap Information, particular care has to be taken to ensure protection of that data including constraints and dependencies within a LWM2M Client/Bootstrap Server relationship according to the adopted security mode.

Concerning Bootstrap from a Smartcard, the same care has to be taken and a secure channel between the Smartcard and the LWM2M Device SHOULD be established as described in Appendix H of OMA LWM2M in reference to GlobalPlatform Secure Channel Protocol 03 (SCP 03) Amendment D v1.1 September 2009.

The keying material used to secure the exchange of information using a DTLS session may be obtained using one of the bootstrap modes referenced in "Details of 3GPP standards and technologies used to implement aspects of the method and system" above. The Resources (i.e. "Security Mode", "Public Key or Identity", "Server Public Key or Identity" and "Secret Key") in the LWM2M Security Object that are associated with the keying material are used either 1) for providing UDP channel security in "Device Registration", "Device Management & Service Enablement", and "Information Reporting" Interfaces if the LWM2M Security Object Instance relates to a LWM2M Server, or, 2) for providing channel security in the Bootstrap Interface if the LWM2M Security Object instance relates to a LWM2M Bootstrap Server.

LWM2M Clients MUST either be directly provisioned for use with a target LWM2M Server (Manufacturer Pre-configuration bootstrap mode) or else be provisioned for secure bootstrapping with an LWM2M Bootstrap Server. Any LWM2M Client which supports Client or Server initiated bootstrap mode MUST support at least one of the following secure methods:

1) Bootstrapping with a strong (high-entropy) pre-shared secret, as described in section 7.1 of OMA LWM2M. The cipher-suites defined in this section MUST NOT be used with only a low-entropy pre-shared secret.

2) Bootstrapping with a temporary, low-entropy pre-shared secret (such as a PIN, password and private serial number) using the cipher-suite TLS_ECDHE_PSK_WITH_AES_128_CBC_SHA256, as defined in RFC5489.

3) Bootstrapping with a public key or certificate-based method (as described in sections 7.1.2 and 7.1.3 of OMA LWM2M). The LWM2M client MUST use a unique key-pair, one which is unique to each LWM2M client.

For full interoperability, a LWM2M Bootstrap Server SHALL support all of these methods.

NOTE: The above security methods can also be used by the LWM2M Bootstrap Server to provision Klc and KID for SMS channel security (see below for SMS channel security).

SMS Channel Security

SMS Secured Packet Structure Mode

The Secured Packet Structure is based on [3GPP TS 31 115]/[ETSI TS 102 225]] which is defining secured packets for different transport mechanisms. The solution was originally designed for securing packet structures for UICC based applications, however, for LWM2M it is suitable for securing the SMS payload exchanged between client and server.

The SMS Secured Packet Structure mode specified in this section MUST be supported when the SMS binding is used.

A LWM2M Client which uses the SMS binding MUST either be directly provisioned for use with a target LWM2M Server (Manufacturer Pre-configuration bootstrap mode or Smart Card Provisioning) or else be able to bootstrap via the UDP binding.

The end-point for the SMS channel (delivery of mobile terminated SMS, and sending of mobile originated SMS) SHALL be either on the smartcard or on the device. When the LWM2M Client device doesn't support a smartcard, the end-point is on the LWM2M Client device.

A LWM2M Client, Server or Bootstrap Server supporting SMS binding SHALL discard SMS messages which are not correctly protected using the expected parameters stored in the "SMS Binding Key Parameters" Resource and the expected keys stored in the "SMS Binding Secret Keys" Resource, and SHALL NOT respond with an error message secured using the correct parameters and keys.

Device End-Point

If the SMS channel end-point is on the device the following settings SHALL be applied: Class 1 SMS as specified in [3GPP TS 23.038]

TP-PID of 111101 (ME Data Download) as specified in [3GPP TS 23.040]

TP-OA: the TP-OA (originating address as defined in [3GPP 23.040] of an incoming command packet (e.g. CoAP request) MUST be re-used as the TP-DA of the outgoing packet (e.g. CoAP response)

Smartcard End-Point

If the SMS channel end-point is on the smart card the following settings SHALL be applied:

Class 2 SMS as specified in [3GPP TS 23.038]. The [3GPP TS 23.040] SMS header MUST be defined as below:
TP-PID: 111111 (USIM Data Download) as specified in [3GPP TS 23.040]
TP-OA: the TP-OA (originating address as defined in [3GPP 23.040] of an incoming command packet (e.g. CoAP request) MUST be re-used as the TP-DA of the outgoing packet (e.g. CoAP response)

SMS Secured Packet Mode Mechanisms

1. Secure SMS Transfer to UICC

A SMS Secured Packet encapsulating a CoAP request received by the LWM2M device, MUST be—according to [ETSI TS 102 225]/[3GPP TS 31.115]—addressed to the LWM2M UICC Application in the Smartcard where it will be decrypted, aggregated if needed, and checked for integrity.

If decryption and integrity verification succeed, the message contained in the SMS MUST be provided to the LWM2M Client.

If decryption or integrity verification failed, SMS MUST be discarded.

The mechanism for providing the decrypted CoAP Request to the LWM2M Client relies on basic GET_DATA commands of [GP SCP03]. This data MUST follow the format as below data_rcv_::=<address><coap_msg>
address::=TP_OA; originated address
coap_msg::=COAP_TAG
<coap_request_length><coap_request>
coap_request_length::=16BITS_VALUE
coap_request::=CoAP message payload NOTE: In current LWM2M release, the way the LWM2M Client Application is triggered for retrieving the available message from the Smartcard is at the discretion of the device: i.e. a middle class LWM2M Device implementing [ETSI TS 102 223] ToolKit with class "e" and "k" support could be automatically triggered by Toolkit mechanisms, whereas a simpler LWM2M device could rely on a polling mechanisms on Smartcard for fetching data when available.

2. Secured SMS Transfer to LWM2M Server

For sending a CoAP message to the LWM2M Server, the LWM2M Client prepares a data containing the right TP-DA to use, concatenated with the CoAP message and MUST provide that data to the LWM2M UICC Application in using the [GP SCP03] STORE-DATA command.

According to [ETSI TS 102 225]/[3GPP TS 31.115] the Smartcard will be in charge to prepare (encryption/concatenation) the CoAP message before sending it as a SMS Secure Packet ([ETSI TS 102 223] SEND_SMS command).

The SMS Secured Packet MUST be formatted as Secured Data specified in section 7.3.1.2.

The Secure Channel as specified in Annex H SHOULD be used to provide the prepared data to the Smartcard.

The SMS channel security is provided by the Secured Packet Structure [ETSI TS 102 225] and [SCP080] which is defining secured packets for different transport mechanisms.

The solution was originally designed for securing packet structures for UICC based applications, however, for LWM2M it is suitable for securing the SMS channel between client and server.

The SMS channel security specified in this section MUST be applied when the SMS binding is used.

When the LWM2M device supports a smartcard, the security SHOULD be terminated on the smartcard. The LWM2M client SHOULD pass SMS messages to the smartcard for encryption and integrity protection before sending, and SHOULD pass encrypted SMS messages received from the LWM2M server to the smartcard for decryption and integrity checking.

A LWM2M Client which supports the SMS binding SHALL support the Secured Packet Structure as defined in [ETSI TS 102 225] and [SCP080]. The LWM2M Client SHALL share the relevant keys—identified by Klc and KID—with a LWM2M Bootstrap Server during bootstrapping, or with a LWM2M Server otherwise.

A LWM2M Bootstrap Server which supports the SMS binding SHALL support the Secured Packet Structure as defined in [ETSI TS 102 225] and [SCP080].

A LWM2M Server which supports the SMS binding SHALL support Secured Packet Structure as defined in [ETSI TS 102 225] and [SCP080].

In SMS Secured Packet Structure mode, a CoAP message as defined in [CoAP] MUST be encapsulated in [3GPP 31.115] Secured Packets, in implementing—for SMS Point to Point (SMS_PP)—the general [ETSI 102 225] specification for UICC based applications.

The following applies to LWM2M Client and LWM2M Bootstrap Server and LWM2M Server:

The "Command Packet" command specified in [3GPP 31.115]/[ETSI TS 102 225] MUST be used for both CoAP Request and Response message.

The Structure of the Command Packet contained in the Short Message MUST follow [3GPP 31.115] specification.

Single DES SHALL NOT be relied on.

AES or Triple DES with three different keys MUST be used.

Preferably, AES should be used. Where AES is used it should be used with CBC mode for encryption (see coding of Klc in [ETSI TS 102 225] section 5.1.2) and in CMAC mode for integrity (see coding of KID in [ETSI TS 102 225] section 5.1.3).

SPI SHALL be set as follows (see coding of SPI in [ETSI TS 102 225] section 5.1.1).:
cryptographic checksum
ciphering
　The ciphering and crypto graphic checksum MUST use either AES or Triple DES
　Single DES SHALL NOT be used
　AES SHOULD be used
　When Triple DES is used, then it MUST be used in outer CBC mode and 3 different keys MUST be used
　When AES is used it MUST be used with CBC mode for ciphering (see coding of Klc in [ETSI TS 102 225] section 5.1.2) and in CMAC mode for integrity (see coding of KID in [ETSI TS 102 225] section 5.1.3
process if and only if counter value is higher than the value in the RE Preferably, TAR (see coding of TAR in [ETSI TS 101 220], section 6) SHALL be set to a value in the range BF FF 00-BF FF FF.

NOTE: A TAR for LWM2M SMS security will be requested from ETSI SCP and the range above applies only until the TAR has been assigned.

Secured Data: contains the Secured Application Message which MUST be coded as a BER-TLV, the Tag (TBD: e.g. 0x05) will indicate the type (e.g. CoAP type) of that message.

There will be two different TARs for terminating the security on the smartcard or on the device.

The ciphering and integrity keys and associated counter values SHOULD be held in a smart card or other tamper-resistant secure storage environment (e.g. embedded secure element). The client SHOULD pass MT SMS to the smart card/SE for decryption and integrity checking, and SHOULD pass MO SMS to the smart card/SE for encryption and integrity protection before sending.

If the keys and associated counter values are not stored in the above recommended way, they SHALL be treated as session keys with a lifetime no greater than the duration of the Registration Lifetime. The LWM2M Client SHALL acquire fresh discard the key material on each "Register" or "Update" operation, load fresh key material using one of the mechanisms described below, and reset the counters.

Re-bootstrapping via the GBA Push mechanism, as described in [OMA DM v2.0] section 9.3.1.3. GBA Push uses a UICC to generate a so called Ks_(ext/int)_NAF shared secret both in the network and in the device. From this master key Ks_(ext/int)_NAF, two session secrets are then generated: the DMBEK and the DMBIK. The value of the Klc (ciphering key for SMS) SHALL be set by truncating DMBEK to the relevant key length (taking bits 0 to 127 for AES-128, or bits 0 to 167 bits for 3DES), and the value of the KID (integrity key for SMS) SHALL similarly be set by truncating DMBIK to the relevant key length (bits 0 to 127 for AES-128, or bits 0 to 167 for 3DES). The GBA Push Info SHALL be delivered to the LWM2M Client using a Class 1 SMS as specified in [3GPP TS 23.038] with a TP-PID of 111101 (ME Data Download) as specified in [3GPP TS 23.040].

Re-bootstrapping from the Smart Card by one of the following methods:

Using the above-described GBA Push mechanism, specifically with GBA-U, and with the Smart Card generating the DMBIK and DMBEK from Ks_int_NAF.

Using Remote File Management (RFM) or Remote Application Management (RAM) as specified in [ETSI TS 102.226]. The LWM2M Server SHALL generate random new key data of appropriate length for Klc and KID and ensure these are delivered to the Smart Card by a Class 2 SMS as specified in [3GPP TS 23.038] with a TP-PID of 111111 (USIM Data Download) as specified in [3GPP TS 23.040], protected using the relevant OTA security keys for RFM or RAM.

The Smart Card SHALL place the updated session keys in the provisioning file EF_LWM2M_Bootstrap.

Re-bootstrapping via the UDP binding, secured as described in Section 7.1 (UDP Security).

Where the UDP binding is unavailable, the LWM2M Server (or Bootstrapping Server) SHOULD send SMS to the LWM2M Client to refresh the session keys before the next attempted "Register" or "Update" operation. If the LWM2M Client attempts to contact the LWM2M Server using an expired registration, or attempts to "Register" or "Update" using a stale key, the LWM2M Server SHALL respond with an error (4.00 Bad Request) and SHALL send SMS to refresh the session keys. However, the LWM2M Server SHOULD send such SMS prior to the expiry of the current Registration, if the LWM2M Client is awake; or if the LWM2M Client is in a sleep cycle, the LWM2M Server (or Bootstrapping Server) SHOULD send such SMS on the next wake up. These measures will avoid a failed "Register" or "Update" operation.

As for Section 7.1 (UDP Security), where a session persists across sleep cycles, encrypted and integrity-protected storage SHOULD be used for the session keys and counters. Alternatively, new session keys SHALL be established by one of the above mechanisms on wake up from a sleep cycle.

Preferably, Klc, KID, SPI and TAR SHALL be stored in the "SMS Binding Key Parameters" Resource.

Preferably, the corresponding key values should be stored in the "SMS Binding Secret Keys" Resource.

A LWM2M Client which uses the SMS binding may either be directly provisioned for use with a target LWM2M Server (Manufacturer Pre-configuration bootstrap mode) or else be able to bootstrap via the UDP binding.

A LWM2M Client, Server or Bootstrap Server supporting SMS binding SHALL discard SMS messages which are not correctly protected using the expected parameters stored in the "SMS Binding Key Parameters" Resource and the expected keys stored in the "SMS Binding Secret Keys" Resource, and SHALL NOT respond with an error message secured using the correct parameters and keys.

LWM2M Object: LWM2M Security

Description: This LWM2M object provides the keying material of a LWM2M Client appropriate to access a specified LWM2M Server. One Object Instance SHOULD address a LWM2M Bootstrap Server These LWM2M object resources MUST only be changed by a LWM2M Bootstrap Server or SmartCard provisioning and MUST NOT be accessible by any other LWM2M Server.

Example Object Info

| Object | Object ID | Object URN | Multiple Instances? | Mandatory? |
|---|---|---|---|---|
| LWM2M Security | 0 | | Yes | Yes |

Resource Info:

| Resource Name | Type | Range or Enumeration | Units | Descriptions |
|---|---|---|---|---|
| LWM2M Server URI | String | 0-255 bytes | — | Uniquely identifies the LWM2M Server or LWM2M Bootstrap Server, and is in the form: "coaps://host:port", where host is an IP address or FQDN, and port is the UDP port of the Server. |

| Resource Name | Type | Range or Enumeration | Units | Descriptions |
|---|---|---|---|---|
| Bootstrap Server | Boolean | | — | Determines if the current instance concerns a LWM2M Bootstrap Server (true) or a standard LWM2M Server (false) |
| Security Mode | Integer | 0-3 | — | Determines which UDP channel security mode is used<br>0: Pre-Shared Key mode<br>1: Raw Public Key mode<br>2: Certificate mode<br>3: NoSec mode |
| Public Key or Identity | Opaque | | — | Stores the LWM2M Client's Certificate (Certificate mode), public key (RPK mode) or PSK Identity (PSK mode). The format is defined in Section E.1.1. |
| Server Public Key or Identity | Opaque | | — | Stores the LWM2M Server's or LWM2M Bootstrap Server's Certificate (Certificate mode), public key (RPK mode) or PSK Identity (PSK mode). The format is defined in Section E.1.1. |
| Secret Key | Opaque | | — | Stores the secret key or private key of the security mode. The format of the keying material is defined by the security mode in Section E.1.1. This resource MUST only be changed by a bootstrap server and MUST NOT be readable by any server. |
| SMS Security Mode | Integer | 0-255 | — | Determines which SMS payload security mode is used (see section 7.2)<br>0: Reserved for future use<br>1: Secure Packet Structure mode device terminated<br>2: Secure Packet Structure mode smartcard terminated<br>3: NoSec mode<br>255: Proprietary modes |
| SMS Binding Key Parameters | Opaque | 6 bytes | — | Stores the KIc, KID, SPI and TAR. The format is defined in Section D.1.2. |
| SMS Binding Secret Keys | Opaque | 32-48 bytes | — | Stores the values of the keys for the SMS binding.<br>This resource MUST only be changed by a bootstrap server and MUST NOT be readable by any server. |
| LWM2M Server SMS Number | Integer | | | MSISDN used by the LWM2M Client to send messages to the LWM2M Server via the SMS binding. The LWM2M Client SHALL silently ignore any SMS not originated from unknown MSISDN |
| Short Server ID | Integer | 1-65535 | — | This identifier uniquely identifies each LWM2M Server configured for the LWM2M Client.<br>This resource MUST be set when the Bootstrap Server resource has false value. Default Short Server ID (i.e. 0) MUST NOT be used for identifying the LWM2M Server. |

| Resource Name | Type | Range or Enumeration | Units | Descriptions |
|---|---|---|---|---|
| Client Hold Off Time | Integer | | s | Relevant information for a Bootstrap Server only. The number of seconds to wait before initiating a Client Initiated Bootstrap once the LWM2M Client has determined it should initiate this bootstrap mode |

UDP Channel Security: Security Key Resource Format

This section defines the format of the Secret Key and Public Key and Identity resources of the LWM2M Server and LWM2M Bootstrap Objects when using UDP Channel security. These resources are used to configure the security mode and keying material that a Client uses with a particular Server. The Objects are configured on the Client using one of the Bootstrap mechanisms described in Section 5.1 of OMA LWM2M. The use of this keying material for each security mode is defined in Section 7.1 of OMA LWM2M.

Pre-Shared Key (PSK) Mode

The PSK is a binary shared secret key between the Client and Server of the appropriate length for the Cipher Suite used [RFC4279]. This key is composed of a sequence of binary bytes in the Secret Key resource. The default PSK Cipher Suites defined in this specification use a 128-bit AES key. Thus this key would be represented in 16 bytes in the Secret Key Resource.

The corresponding PSK Identity for this PSK is stored in the Public Key or Identity resource. The PSK Identity is simply stored as a UTF-8 String as per [RFC4279]. Clients and Servers MUST support a PSK Identity of at least 128 bytes in length as required by [RFC4279].

Raw-Public Key (RPK) Mode

The raw-public key mode requires a public key and a private key of the appropriate type and length for the Cipher Suite used. These keys are carried as a sequence of binary bytes with the public key stored in the Public Key or Identity Resource, and the private key stored in the Secret Key Resource. The default RPK Cipher Suites defines in this specification use a 256-bit ECC key. Thus the Certificate Resource would contain a 32 byte public key and the Secret Key Resource a 32 byte private key.

Certificate Mode

The Certificate mode requires an X.509v3 Certificate along with a matching private key. The private key is stored in the Secret Key Resource as in RPK mode. The Certificate is simply represented as binary X.509v3 in the value of the Public Key or Identity Resource.

SMS Payload Security: Security Key Resource Format

This section defines the format of the Secret Key and Public Key and Identity resources of the LWM2M Server and LWM2M Bootstrap Objects when using SMS Payload security. These resources are used to configure keying material that a Client uses with a particular Server. The Objects are configured on the Client using one of the Bootstrap mechanisms described in Section 5.1. The use of this keying material is defined in Section 7.2.

The SMS key parameters are stored in the order Klc, KID, SPI, TAR (Klc is byte 0).

Ordering of bits within bytes SHALL follow ETSI TS 102 221 "Coding Conventions" (b8 MSB, b1 LSB).

Unbootstrapping

If a Security Object Instance is to be deleted, some related resources and configurations need to be deleted or modified. Therefore when Delete operation is sent via Bootstrap Interface, the Client MUST proceed following procedure.

1. If there is an Object Instance that can be accessed only by a Server of the Server Object Instance (i.e. the Server is Access Control Owner and the LWM2M Server can access the Object Instance only in an Access Control Object Instance), the Object Instance and the corresponding the Access Control Object Instance MUST be deleted
2. If an Object Instance can be accessed by multiple Servers including the Server which Security Object Instance is to be deleted, then:
    An ACL Resource Instance for the Server in Access Control Object Instance for the Object Instance MUST be deleted
    If the Server is Access Control Owner of the Access Control Object Instance, then the Access Control Owner MUST be changed to another Server according to the rules below: The Client MUST choose the Server who has highest sum of each number assigned to an access right (Write: 1, Delete: 1) for the Access Control Owner. If two or more Servers have the same sum, the Client MUST choose one of them as the Access Control Owner.
3. Observation from the Server MUST be deleted
4. The Server Object Instance MUST be deleted
5. Client MAY send "De-register" operation to the Server
Note: To monitor the change of Access Control Owner, the Server MAY observe Access Control Owner Resource.

Figure 5:
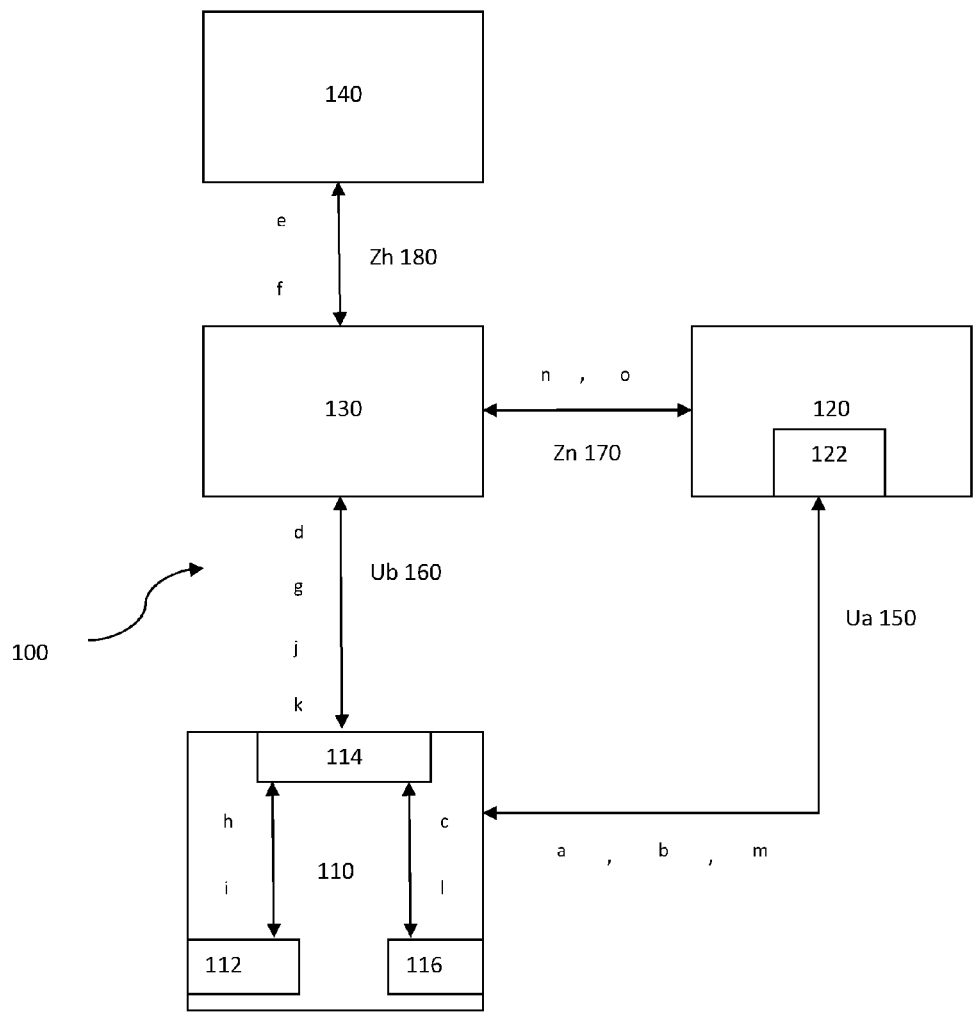
FIG. 5 shows a schematic diagram of an example of an architecture with example communication exchange steps that can be used, in particular, with GBA.

FIG. 5 shows a system 100 for establishing a secure connection with a machine to machine (M2M) device using the generic bootstrapping architecture (GBA) standard (defined in TS 33.220), which is part of a complex of standards called Generic Authentication Architecture, a guide to which is provided in TR 33.919. The system 100 comprises a network application function (NAF) 122, which may be a software component within a device management server 120, a user equipment (UE) 110, which is an M2M device, a bootstrapping server function (BSF) 130 and a home location register (HLR)/home subscriber system (HSS) 140.

The NAF 122 is configured to provide any sort of application or service to the UE 110 via communications channel Ua 150. It may be any server or network component which terminates the Ua interface (described below) from the UE 110.

The UE 110 comprises a device management (DM) client 116 that is configured to communicate with the NAF 122 via communications channel Ua 150. The interface and communication methods between the DM client 116 and NAF 122 via Ua 150 may be of any suitable type. For example, any suitable device management protocol may be utilised, such as OMA DM 2.0, OMA lightweight M2M, constrained application protocol (CoAP), CoAP over datagram transport layer security (DTLS) (CoAPs), TR-069 etc, and/or any suitable M2M services may be executed via Ua 150, such as binary short messaging services (SMS), reporting an M2M sensor reading; M2M location reporting etc.

The UE 110 also comprises a generic authentication architecture (GAA) server 114 that is configured to communicate with the BSF 130 via communications channel Ub 160. The interface and communication methods between the GAA server 114 and the BSF 130 via Ub 160 may be of any suitable type. For example hypertext transfer protocol (http), http over transport layer security (TLS) (https) etc.

The UE 110 also comprises a universal integrated circuit card (UICC) 112, for example a subscriber identity module (SIM) card or embedded SIM, which may securely hold data relating to the UE 110.

The BSF 130 is configured to utilise the GBA standard (defined in TS 33.220) to enable a shared secret to be derived (bootstrapped) using the existing security association between a mobile network and the UICC 112 so that the NAF 122 and UE 110 are able to establish a secure association for secure communications via Ua 150.

To that end, the BSF 130 is configured to communicate with the NAF 122 via Zn 170 so that the NAF 122 is able to request and/or obtain a shared secret that the NAF 122 may use to establish secure communication with the UE 110.

Furthermore, the BSF 130 is also configured to communicate with the HLR/HSS 140 via Zh 180 so that it may utilise the mobile network data contained in the HLR/HSS 140 as part of the GBA process. The interface and communication methods between the BSF 130 and the HLR/HSS 140 via Zh 180 may be of any suitable type. The HLR/HSS 140 may be any server side element that stores subscription details and credentials for each UICC issued by an operator. It may be "GBA-aware" (so that it stores details for a GBA user subscription), for example an HSS, or it may be a legacy component that is not "GBA-aware", for example an HLR.

FIG. 5 also identifies communication steps (a) to (o) between the elements of system 100, wherein those steps are used to carry out the GBA process of establishing a shared secret between the NAF 122 and the UE 110.

Figure 6:
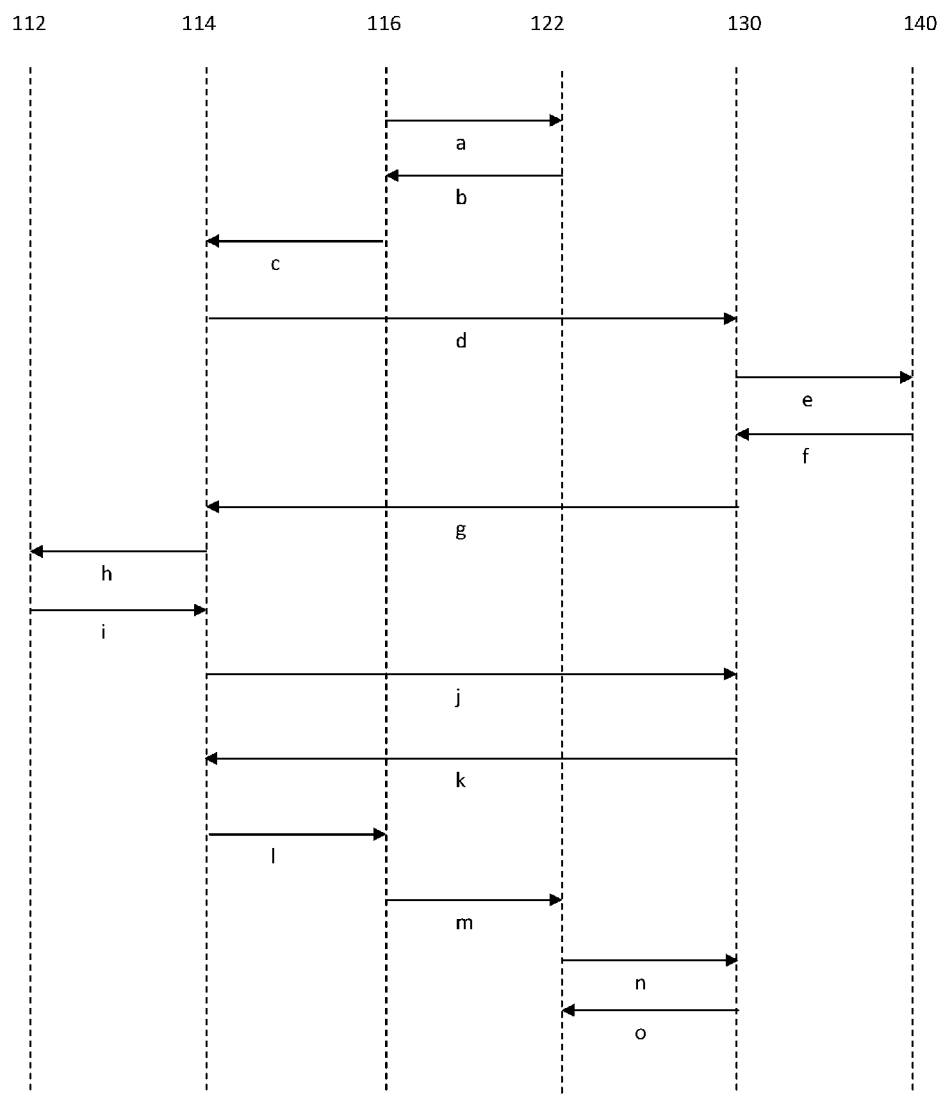
FIG. 6 shows an exemplary flow diagram of communications exchanged within the exemplary architecture of FIG. 5.

FIG. 6 shows an example sequence diagram that includes the communication steps (a) to (o) that are used for establishing a shared secret between the NAF 122 and the UE 110. The shared secret enables keys to be established at the NAF 122 and the UE 110 so that secure communication can take place between the NAF 122 and the UE 110. For example, the shared secret may itself be a key for establishing secure communication, and/or a session key(s) may be derived from the shared secret in order to establish secure communication.

In step (a), the DM client 116 contacts the NAF 122 via Ua 150, for example to request a service and/or application from the NAF 122. In step (b), the NAF 122 responds by indicating that it supports GBA-bootstrapping and that a shared secret is required in order to establish secure communication for the NAF 122 to provide the requested service and/or application to the UE 110. The communication in step (b) may, for example, be a "server hello" message. Alternatively, the NAF 122 may contact the DM client 116 via Ua 150 in step (b) without step (a) having been carried out (for example, if the NAF 122 wishes to establish secure communication with the UE 110 in order to provide a service and/or application to the UE 110).

If the DM client 116 already has a bootstrapped key, it may proceed to step (m) and provide the NAF 122 with an identifier for the bootstrapped key, for example a transaction identifier such as a B-TID (Bootstrap Transaction Identifier). This is described in more detail below and may enable the subsequent steps (n) and (o) to be carried out and a secure connection to be established between the NAF 122 and UE 110.

If the DM client 116 does not already have a bootstrapped key, for example because no shared secret has yet been derived, or the existing shared secret has expired, or is otherwise considered to be invalid by the NAF 122 (for example, if the DM client 116 has provided a B-TID in step (m) and the NAF 122 has responded that it considers the corresponding shared secret to be invalid), the DM client 116 may set about acquiring a new shared secret using GBA.

In step (c), the DM client 116 requests that the GAA server 114 obtain a shared secret. In step (c), the DM client 116 will also pass to the GAA server 114 an identifier of the NAF 122, for example NAF_Id (which may be a concatenation of NAF FQDN and Ua security protocol Id), which it has obtained in step (b). Alternatively, rather than step (c) being carried out after steps (a) and (b), or step (b), the UE 110 may itself identify that it requires a bootstrapped key in order to establish secure communication with the NAF 122 and therefore carry out step (c) without either of steps (a) or (b) taking place first. In this case, the identifier of the NAF_Id may be stored in memory on the UE 110, or obtained by the UE 110 by any other means.

In step (d), the GAA server 114 contacts the BSF 130 to request that a shared secret be derived. The request may be a basic http GET request, or any other suitable request. The GAA server 114 may also present to the BSF 130 in step (d) an identifier of the UE 110, for example an international mobile subscriber identity (IMSI) or a temporary mobile subscriber identity (TMSI), or an IP multimedia private identity (IMPI) or temporary mobile private identity (TMPI) if anonymity is required.

In step (e), the BSF 130 requests an authentication vector from the HLR 140. In step (f), the HLR/HSS 140 returns a new authentication vector to the BSF 130. The authentication vector may comprise a random or pseudorandom number (RAND), an authentication token (AUTN), an expected response (XRES), a cipher key (CK) and an integrity key (IK). The CK and the IK are derived from an existing shared secret, K, (for example using the RAND and AUTN) that is shared between the network provider and the UE 110, wherein the network stores their value of K and the UE 110 stores its value of K in the UICC 112. The contents of the authentication vector are described in more detail in the 3GPP "Security Architecture" specification TS 33.102, which may be found at http://www.3gpp.org/ftp/specs/html-info/33102.htm.

The existing shared secret may alternatively be the Ki, for example in 2G/GSM, which is explained in more detail in the 3GPP specification TS 11.11 "Specification of the Subscriber Identity Module-Mobile Equipment (SIM-ME) Interface" (originally GSM 11.11), in particular in sections 8.16 and 9.2.16, which may be found at http://www.3gpp.org/DynaReport/1111.htm.

Having received the authentication vector, the BSF 130 generates a transaction identifier (B-TID) and transmits the B-TID along with part of the authentication vector, for example the RAND and AUTN, back to the GAA server 114 in step (g). The BSF 130 may also indicate to the GAA server 114 in step (g) the lifetime of the B-TID and an associated key(s). The associated key may be, for example, a Ks, which is a concatenation of CK and IK. For example, as explained in 3GPP specification TS 33.220, the BSF 130 may generate key material Ks by concatenating CK and IK and generate the B-TID by taking the base 64 encoded RAND value and the BSF server name i.e. base64encode (RAND)@BSF_servers_domain_name.

The GAA server 114 may then attempt to authenticate the BSF 130 by forwarding the RAND and AUTN to the UICC 112 in step (h). The RAND and AUTN may be used as inputs to the USIM application on the UICC 112 to run an Authentication and Key Agreement (AKA) algorithm, as explained in 3GPP TS33.102. If the UICC 126 validates the AUTN, the BSF 130 will be authenticated and the UICC returns a RES (which may be generated as part of the AKA algorithm), a CK and an IK to the GAA server 114 in step (i).

In step (j), the GAA server 114 uses the RES to protect communication with the BSF 130 so that the BSF 130 can authenticate the UE 110. The communication in step (j) may be an http digest message so that http digest authentication may be executed. However, the communication in step (j) may take any other suitable form for the BSF 130 to authenticate the UE 110.

The BSF 130 may then authenticate the UE 110, for example using XRES to verify an http digest. If there is a match, the UE 110 is successfully authenticated and the BSF 130 may store a tuple comprising, for example, the identifier of the UE 110, such as the IMPI, IMSI, TMPI or TMSI, (which the BSF 130 received from the UE 110 in step (d)), the B-TID (which the BSF 130 generated after step (f)), the RAND, the CK and the IK (all of which the BSF received in the authentication vector in step (f)) and notifies the GAA Server 114 in step (k) that authentication was successful.

On receipt of the indication in step (k) that authentication was successful, the GAA Server 114 may store in memory on the UE 110 the B-TID and RAND (which the GAA Server 114 received from the BSF 130 in step (g)) and the CK and IK (which the GAA Server 114 received from the UICC 112 in step (i)). The GAA Server 114 may then generate key material Ks by concatenating CK and IK and derive a shared secret, Ks_NAF, using Ks, RAND, the identifier of the UE 110 (such as the IMPI, IMSI, TMPI or TMSI) and the NAF_Id (which it received in step (c)). In step (l) the B-TID and derived Ks_NAF are then passed to the DM client 116.

The Key Derivation Function is described in Annex B of TS 33.220. In particular, section B.3 indicates that:
Ks_NAF=KDF (Ks, "gba-me", RAND, IMPI, NAF_Id),
Ks_ext_NAF=KDF (Ks, "gba-me", RAND, IMPI, NAF_Id), and
Ks_int_NAF=KDF (Ks, "gba-u", RAND, IMPI, NAF_Id).

All of these derivations involve RAND as an input parameter.

However, all of these also involve Ks as an input parameter, where Ks=CK∥IK is constructed from the output returned
by the USIM, and of course RAND was an input parameter to the USIM. So the "RAND" has already been used. It may be possible to simply modify the derivation functions so they
omit the RAND, or substitute a known fixed value (all zeroes, say) for the RAND. Therefore, Ks_NAF may alternatively be derived using Ks, the identifier of the UE 110 and the NAF_Id, without using RAND.

The DM client 116 now has the secret Ks_NAF and session identifier B-TID. However, the NAF 122 does not yet have the secret so it is not yet possible for a secure connection over Ua 150 to be established.

In step (m), the DM client 116 contacts the NAF 122 and presents the B-TID to the NAF 122. The NAF 122 is then able in step (n) to contact the BSF 130 and present it with the B-TID that the DM client 116 had passed to the NAF 122.

Having received the B-TID from the NAF 122, the BSF 130 can authenticate the NAF 122, derive the Ks_NAF from the Ks that is associated with the B-TID (for example by generating key material Ks by concatenating CK and IK and then deriving Ks_NAF using Ks, RAND, the identifier of the UE 110 and the NAF_Id) and return the Ks_NAF to the NAF 110 together with an indicator of the lifetime of the key associated with the B-TID (for example, the Ks).

Thus, if Ks has expired, the NAF 122 is able to contact the UE 110 and notify it of the expiry, in which case steps (c) to (l) may be undertaken again by the UE 110 to obtain a new Ks and therefore a new Ks_NAF. If the Ks is still valid, the NAF 122 and the UE 110 will now both have a valid Ks_NAF, which may be used directly as a key to establish secure communication on Ua 150, or may be used by the NAF 122 and the UE 110 to derive their own session keys for further secure communication on Ua 150.

The interface between the UE 110 and the BSF 130 over Ub 160 is based on http and HTTP Digest authentication. Whilst it may be possible to implement communications using http and HTTP Digest authentication over Ub 160 without requiring a full browser implementation, carrying out communications using http and HTTP Digest on Ub 160 and CoAP communications on Ua 150 may cause additional complexities when the UE 110 is an M2M device.

In the above process, the UICC 112 utilises the USIM application to run an Authentication and Key Agreement (AKA) algorithm, as explained in 3GPP TS33.102, in order to obtain the CK and IK (or Ks) and RES.

However, in an alternative, the UICC 112 may utilise the SIM application on the UICC 112. In this instance, the command "RUN GSM" could be utilised on the UICC 112, as defined in section 8.16 and 9.2.16 of 3GPP TS 11.11 (originally GSM 11.11). The input to the command may be a 16 byte (128 bit) "RAND" and the output may be a 4 byte (32 bit) "SRES" (abbreviation for signed response) together with an 8 byte (64 bit) cipher key "Kc". The SIM card implements two algorithms at once: A3 (the "authentication" algorithm) combines the RAND with the 128 bit secret Ki (stored on the UICC 112) and returns SRES; A8 (the "key agreement" algorithm) combines RAND with Ki and returns Kc.

In normal GSM communication the SRES is passed to mobile terminal to be sent to the GSM base-station (where the base station compares it against an expected SRES which it has obtained from the Authentication Centre AuC, along with the RAND and the Kc). After successful authentication, the cipher key Kc is used to encrypt traffic between the mobile terminal and the GSM base station. However, 2G GBA performs some additional operations (that are described TS 33.220) with the SRES and Kc in order to bring the overall security level closer to that achieved using a USIM with GBA.

Operators may be free to implement their own versions of A3 and A8, but various industry example algorithms have existed since the 1990s (COMP128, COMP128v2, COMP128v3). The most secure example algorithm is based on the Advanced Encryption Standard (AES) and is called "GSM MILENAGE": http://www.3gpp.org/DynaReport/55205.htm.

The major differences between SIM and USIM are: there is no AUTN (i.e. no way for the SIM to authenticate the source of the RAND) when using SIM; there is no integrity key ("IK"), only a ciphering key when using SIM; the cipher key-length is shorter (64 bits instead of 128 bits). Further, the crypto-algorithms which use Kc for ciphering (A5/1, A5/2, A5/3) are much weaker than the cipher algorithms used in 3G and LTE.

Figure 7:
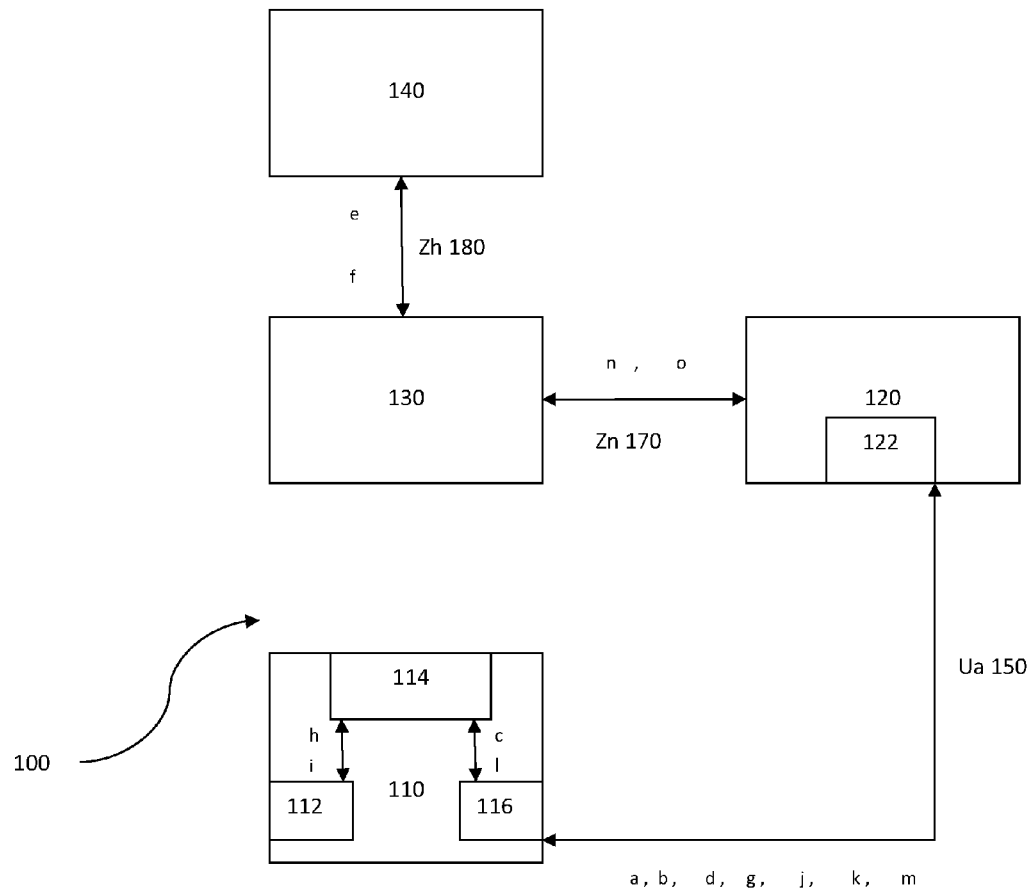
FIG. 7 shows a schematic diagram of an example alternative architecture utilising a tunnelled interface.

FIG. 7 shows a representation of an alternative implementation wherein the Ub 160 interface is "tunnelled" within the Ua 150 interface. The NAF 122 is configured to support Ub 160 "tunnelled" via Ua 150 such that the above described communications between the UE 110 and the BSF 130 as part of the GBA process may be carried out via the tunnelled Ub 160 interface. For example, Ua 150 may be "re-purposed" such that Ua commands may be used to carry data that would be transmitted between the BSF 130 and the UE 110 via Ub 160. In this way, the UE 110 need only support the CoAP protocol, and not HTTP as well. Thus, the GBA process steps described above may be carried out in a simplified system.

Any suitable commands or parameters in the Ua 150 interface may be utilised to carry out the "tunnelled" Ub 160 interface. For example, a Ub request, such as step (d) described above, might be carried using the "Register" or "Update" logical operation on Ua 150. The Ub response, such as step (g) described above, might be carried using the "Write" logical operation on Ua 150.

Figure 8:
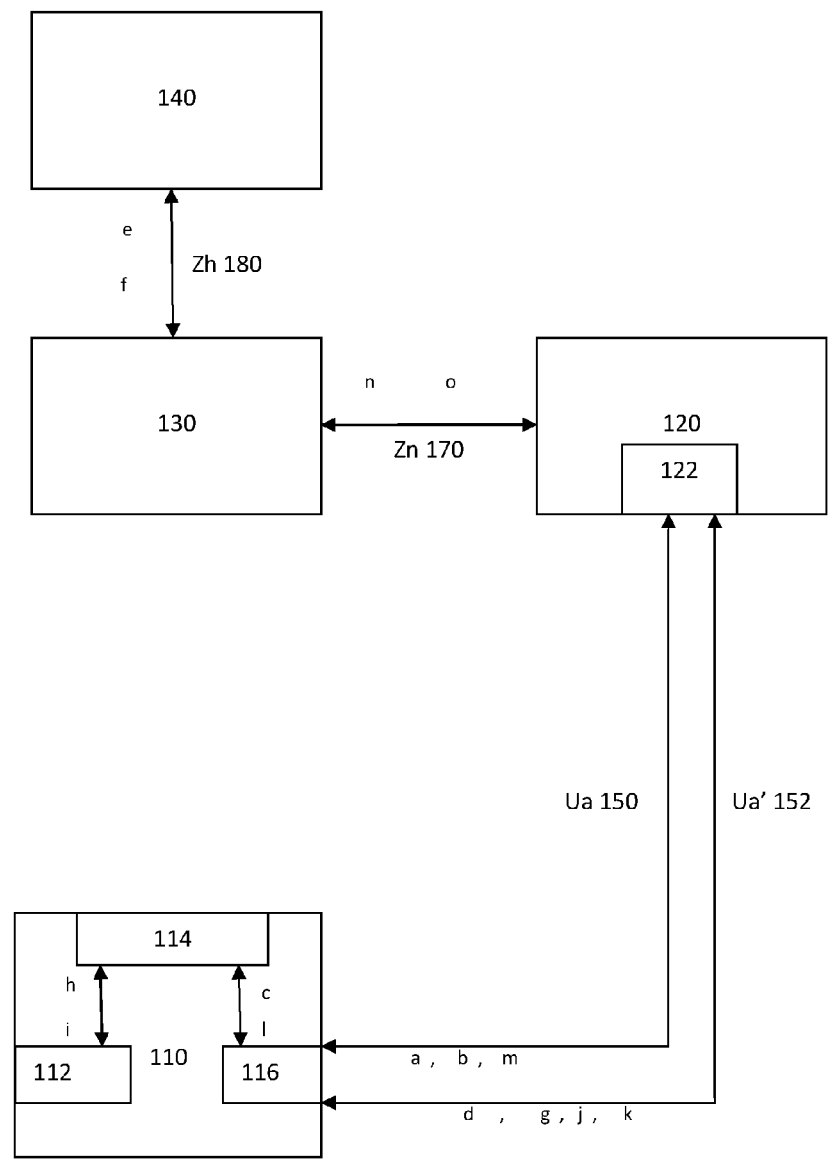
FIG. 8 shows a further schematic diagram of an example alternative architecture utilising a tunnelled interface.

FIG. 8 shows a representation of a further alternative implementation, wherein the Ub 160 interface is "tunnelled" within an interface Ua' 152. The interface Ua' is distinct from Ua and may be established to conform or not to conform to any standards, for example, it may be an interface that is not defined as part of the 3GPP standards, but rather by alternative standards, such as LWM2M or another standard device management interface (in the case where Ua is not such an interface). The NAF 122 is configured to support Ub 160 "tunnelled" via Ua' 152 such that the above described communication between the UE 110 and the BSF 130 as part of the GBA process may be carried out via the "tunnelled" Ub 160 interface. The shared secret may thus be established between the NAF 122 and the UE 110 using, at least in part, Ub 160 "tunnelled" via Ua' 152, such that secure communication on Ua may be established.

Any suitable commands or parameters in the Ua' 152 interface may be utilised to carry out the "tunnelled" Ub 160 interface. In this instance, Ua' 152 will be bi-directional, in order to support messages from UE 110 to the NAF 122 as well as a message from the NAF 122 to the UE 110. There should also be sufficient space within the commands or parameters of Ua' 152 to carry the Ub 160 messages, as defined in TS 24.109, Annex A.

By "tunneling" the Ub 160 interface via the Ua 150 or Ua' 152 interface, the UE 110 no longer needs to support one interface with the BSF 130 and a further interface with the NAF 122. Therefore, the UE 110 need only support one protocol (for example, the CoAP protocol, or alternatively the LWM2M protocol, or any other suitable protocol) on the interface between the UE 110 and the NAF 122 and not also a further protocol (for example, http) on an interface between the UE 110 and the BSF 130. This may enable the design and operation of the UE 110 to be simplified.

In a further alternative implementation, a GBA "push" variant may be utilised and push messages may be carried to the UE 110 within the Ua 150 interface.

Figure 9:
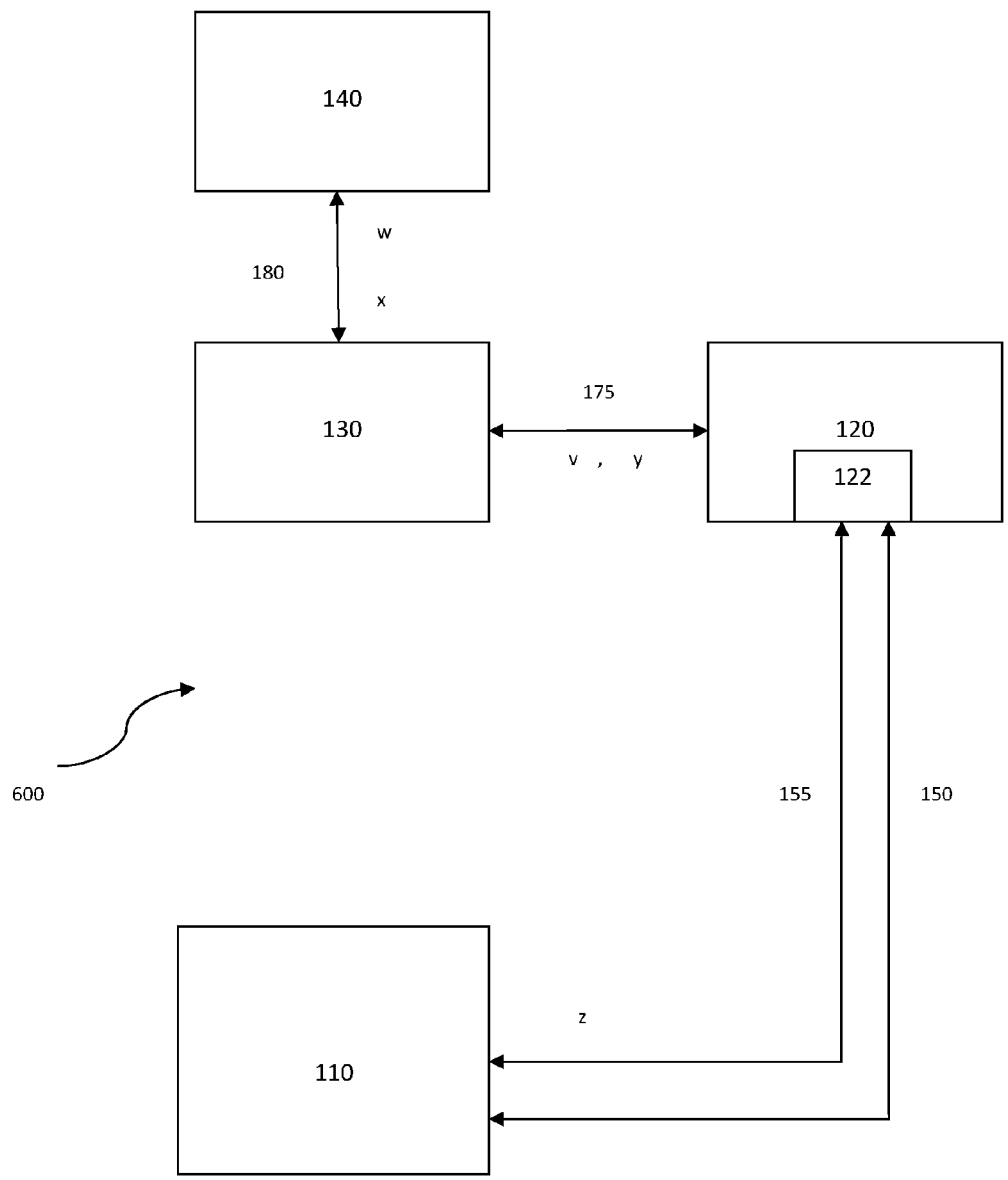
FIG. 9 shows a schematic diagram of an example alternative architecture utilising push messages.

FIG. 9 shows a system 600 for establishing a secure connection with a machine to machine (M2M) device using the generic bootstrapping architecture (GBA) standard and the GBA "push variant".

The system is similar to that shown in FIG. 5, but comprises a Upa interface 155 between the UE 110 and NAF 122 for carrying push messages within the Ua interface 150. The system 600 also comprises a Zpn interface 175 between the NAF 122 and the BSF 130 for carrying push related information.

FIG. 9 also identifies communication steps (v) to (z) between the elements of system 600, wherein those steps are used to carry out a GBA push process of establishing a shared secret between the NAF 122 and the UE 110.

Figure 10:
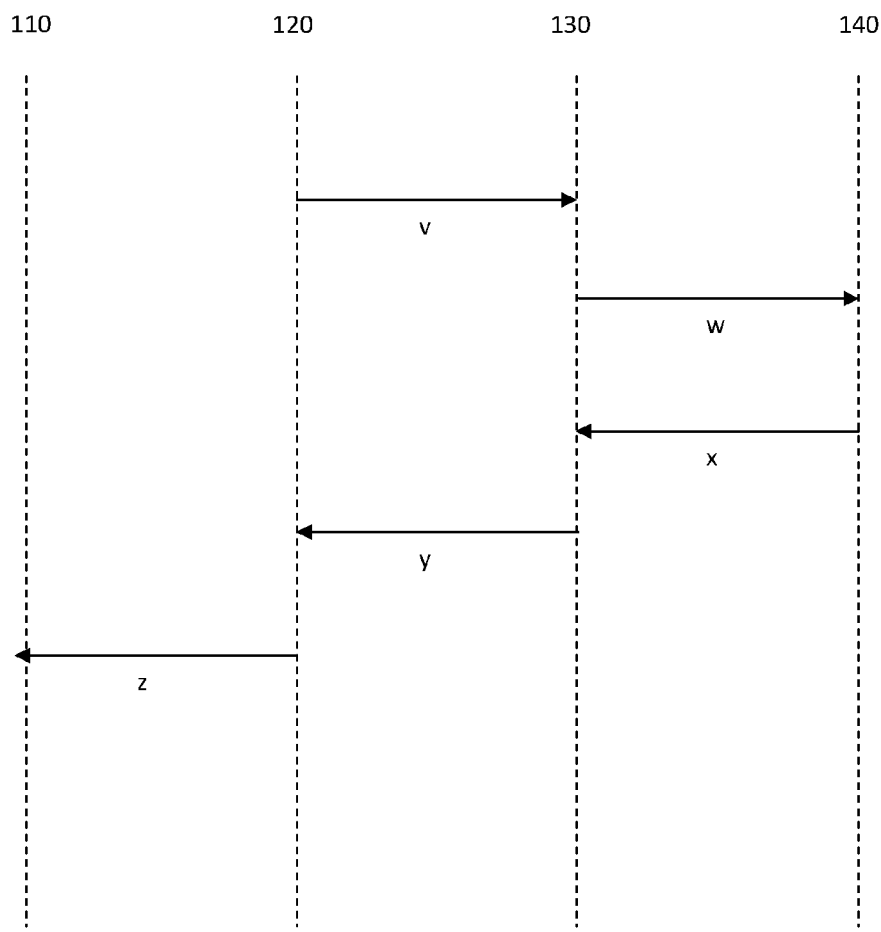
FIG. 10 shows an exemplary flow diagram of communication exchanged within the exemplary architecture of FIG. 9.

FIG. 10 shows an example sequence diagram that includes the communication steps (v) to (z) that are used for establishing a shared secret between the NAF 122 and the UE 110 so that secure communication between the NAF 122 and the UE 110 can be established.

When the NAF 122 determines that a shared secret needs to be established between the NAF 122 and the UE 110 (for example, when the UE 110 notifies the NAF 122 that it does not have a shared secret, which may take place in response to a request by the NAF 122 to establish secure communication, or at any other time) and that the UE 110 is registered for push services (for example, because the UE 110 notifies the NAF 122 to that effect) the NAF 122 will generate a GBA push information (GPI) request and transmit it to the BSF 130 in step (v). The GPI request may comprise an identifier of the UE 110, for example the IMPI, IMSI, TMPI or TMSI of the UE 110, and/or an identifier of the NAF 122, for example a NAF_Id.

The NAF may determine that UE 110 is registered for push services because the UE 110 notifies the NAF 122 to that effect. Alternatively, the NAF 122 may have a pre-established table that is based on UE 110 identifier range and indicates if the UE 110 is registered for push services or not. The NAF 122 may look up an identifier presented to it by the UE 110 and check it against the UE 110 identifier range table in order to determine if the UE 110 is registered for push services. Alternatively, the NAF 122 may transmit the request in step (v) before checking that the UE 110 is registered for push services, and rely on the BSF to advise it if the UE is registered and authorised.

On receiving the GPI request from the NAF 122, the BSF 130 may check that the UE 110 and the NAF 122 are authorized for establishing secure communication using a push implementation. The BSF 130 may itself have authorisation data for UEs and NAFs, or it may obtain an indication of whether or not the UE 110 and NAF 122 is authorised from the HLR/HSS 140 as part of step (w) described below. For example, UE and NAF authorisation data may be part of the GUSS described below, or may be retrieved from the NLR/HSS 140 separately from the GUSS.

If the identifier of the UE 110 is a public identifier, for example an IMPI or TMPI, the BSF 130 may optionally resolve the identifier to a private identifier, for example an IMSI or TMSI.

If the UE 110 and NAF 122 is authorised, in step (w) the BSF 130 transmits to the HLR/HSS 140 a request for a new authentication vector (AV) and the subscriber's GBA User Security Settings (GUSS). Alternatively, the BSF 130 may transmit the request in step (w) before checking that the UE 110 and NAF 122 is authorised for push services, and rely on the HLR/HSS to advise it if the UE 110 and NAF 122 is authorized, for example if an indication of authorization forms part of the GUSS. The GUSS are settings per user, containing BSF specific information and the set of all application-specific user security settings, USS (i.e. settings particular to each UE 110 and NAF 122 pairing).

In step (x), the HLR/HSS 140 returns the AV and the GUSS to the BSF 130. As explained earlier in respect of FIGS. 4 and 5, the AV may comprise a RAND, an AUTN, an XRES, a CK and an IK.

The BSF 130 may then check the GUSS, for example to determine if the user/subscription of the UE 110 is authorised to access the service and/or what type of keys should be used for the establishment of secure communication etc. The BSF 130 may generate and store any keys that are required, and these keys may be based on the identity of the NAF 122 (for example based on the NAF_Id). For example, if the shared secret, Ks_NAF (described above) is to be used directly as a key for establishing secure communications, the BSF 130 may generate the Ks_NAF in the manner identified above. If another derived key is to be used as a key for establishing secure communications, for example Ks_ext_NAF or Ks_int_NAF, the BSF 130 may generate Ks and then derive the necessary key(s).

The BSF 130 will also generate a GPI Response comprising information that enables the NAF 122 and the UE 110 to set up a secure association (SA) (described in more detail below). After generating the GPI Response, the BSF 130 sends the GPI Response to the NAF 122 in step (y). For example, the GPI Response may comprise at least part of the authentication vector, for example the RAND and AUTN. The GPI Response may also comprise an identifier, a P-TID (push transaction identifier), that may be used to identify key material to be used to establish secure communication (for example the Ks). In this way, the P-TID may be considered to be a push implementation version of the B-TID identified above. The GPI response may also comprise information indicating what key(s) should be used to establish secure communication and/or how those keys may be derived and/or how the key(s) should be used to establish secure communication. The GPI response may also comprise an indication of the life-time of the key(s), which indicates for how long the key(s) may be used before they need to be refreshed.

If the BSF 130 has determined that the UE 110 is not authorised or registered for push services, the BSF 130 may transmit to the NAF 122 in step (y) a "not authorized" message. If the NAF 122 is maintaining a local database of UEs which are authorized or registered for push services, for example the pre-established table described above, the NAF 122 may then update its local database to record if the UE is authorised for push services.

Having received the GPI response, the NAF 122 may set up and store a security association (NAF_SA) comprising at least some of the GPI response information and any other suitable user information, for example an identifier of the UE 110 etc.

In step (z), the NAF 122 forwards the GPI response to the DM client 116 in a push message using the UPa 155, which in turn forwards the GPI response to the GAA server 114. When the GAA server 114 receives the GPI response, it may process the contents of the GPI response to set up and store on the UE 110 a corresponding NAF_SA. For example, the UE 110 may pass the AUTN and RAND that was part of the GPI response to the UICC 112 in order to authenticate the BSF and obtain the CK and IK from the UICC 112, for example by running an authentication challenge AUTHENTICATE on the USIM application of the UICC as explained above. If the AUTN is accepted by the UICC 112, the BSF 130 can be considered by the UE 110 to have been authenticated. The UICC 112 may then return a CK and IK to the GAA server 114, using which the GAA server 114 can derive a Ks and subsequently a shared secret, Ks_NAF (as explained earlier).

Having received the GPI response and generated the Ks_NAF, the GAA server 114 is able to set up and store its NAF_SA. The NAF_SA may comprise a key(s) for establishing secure communication. The GPI response can inform the UE 110 what the key(s) should be, for example if the Ks_NAF may be used directly as the key, or if another key(s) should be derived and stored as part of the NAF_SA. If a new key(s) should be derived, the UE 110 may follow the derivation process indicated in the GPI response.

Having established the NAF_SA at the UE 110, both the NAF 122 and the UE 110 will have the NAF_SA, thereby enabling secure communication to be established between the two. As part of establishing secure communication, the NAF 122 may effectively validate the UE 110 through successful use of the Ks_NAF (since only a legitimate UE 110 could derive the correct Ks_NAF and use them with the NAF 122).

Figure 11:
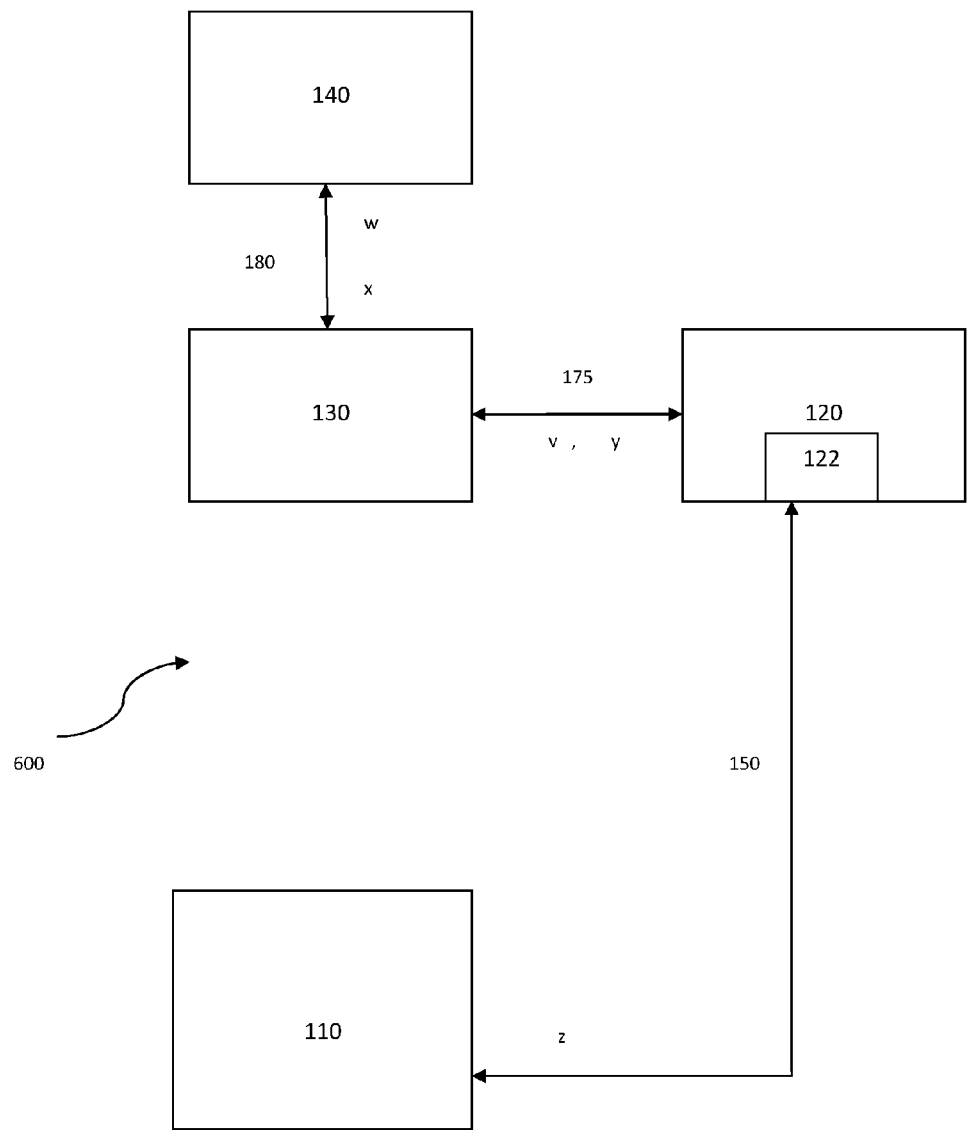
FIG. 11 shows a schematic diagram of an example alternative architecture utilising a tunnelled interface.

FIG. 11 shows an alternative implementation wherein the Upa 155 interface is "tunnelled" within the Ua 150 interface. The NAF 122 is configured to support Upa 155 "tunnelled" via Ua 150 such that the above described push communications between the NAF 122 and the UE 110 may be carried out via the "tunnelled" Upa 155 interface. For example, Ua 150 may be "re-purposed" such that Ua commands may be used to carry data that would be transmitted from the NAF 122 to the UE 110 via Upa 155. In this way, the UE 110 need only support the CoAP protocol on Ua 150 (or alternatively the LWM2M protocol, or any other suitable protocol) without also needing to support a Upa 150 interface.

Any suitable commands or parameters in the Ua 150 interface may be utilised to carry the "tunnelled" Upa 155 interface. For example, the GPI response transmitted to the UE 110 in step (z), might be carried using the "Write" logical operation on Ua 150.

Figure 12:
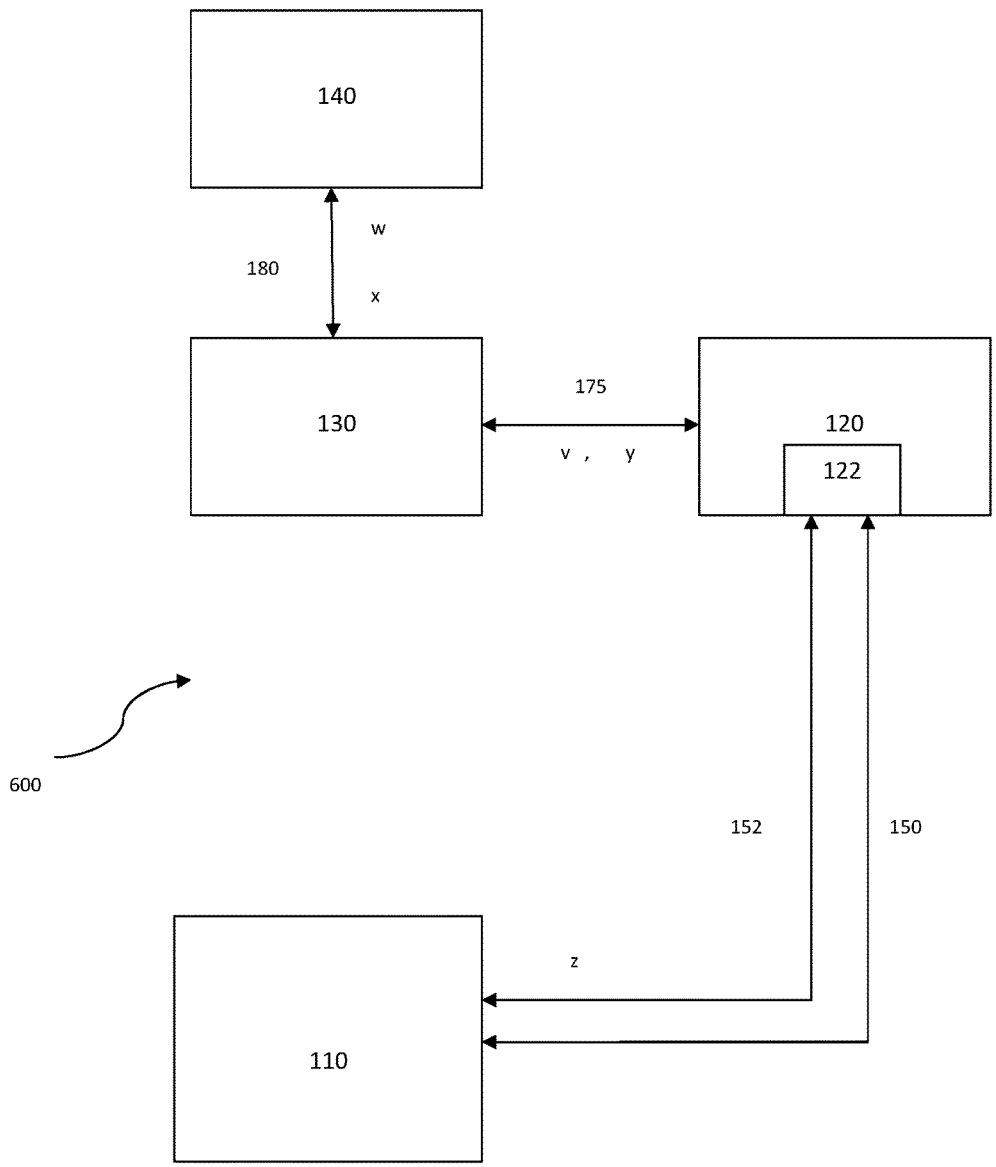
FIG. 12 shows a further schematic diagram of an example alternative architecture utilising a tunnelled interface.

FIG. 12 shows a representation of a further alternative implementation, wherein the Upa 155 interface is "tunnelled" within an interface Ua' 152. The interface Ua' is distinct from Ua and may be established to conform or not to conform to any standards, for example, it may be an interface that is not defined as part of the 3GPP standards, but rather by alternative standards, such as LWM2M or another standard device management interface (in the case where Ua is not such an interface). The NAF 122 is configured to support Upa 155 "tunnelled" via Ua' 152 such that the above described push communications between the NAF 122 and the UE 110 may be carried out via the "tunnelled" Upa 155 interface.

Any suitable commands or parameters in the Ua' 152 interface may be utilised to carry the "tunnelled" Ub 160 interface. In this instance, Ua' 152 may be unidirectional, carrying messages from the NAF 122 to the UE 110 only, or may be bi-directional, in order to support messages from UE 110 to the NAF 122 as well as message from the NAF 122 to the UE 110. There should also be sufficient space within the commands or parameters of Ua' 152 to carry the Upa 155 messages.

Through use of the push implementation, the UE 110 no longer needs to support one interface with the BSF 130 and a further interface with the NAF 122. Furthermore, by "tunneling" Upa 155 via Ua 150 or Ua', the UE 110 does not need to support the Upa 155 connection. This makes it possible to simplify the design and operation of the UE 110.

It is to be understood that the above description is given by way of example and only for the benefit of understanding the solution, and it must include also any combination of the above features, as well as any alterations, modifications or otherwise addition which could be done by a skilled person by use of his/her skills and/or general knowledge in the relevant and/or neighbouring art.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

In the above embodiments the NAF 122 is implemented as part of the DM server 120, for example as a plug-in component to the DM server 120. In the Ub "tunneling" implementations (FIGS. 6 and 7), the NAF 122 manages the Zn interface 170 and the "tunneling" of the Ub interface 160 within the Ua 150 or Ua' 152 interface with the NAF 122 plug-in component acting as an intermediary between the UE 110 and the BSF 130 when the tunnel is in effect. In the push implementations (FIGS. 8 and 9), the NAF 122 manages the Zn interface 170 and the insertion of the push information GPI into the "tunnelled" Upa 155 interface.

However, the NAF 122 may be any server or network component which terminates the Ua 150 interface from the UE 110 and uses a shared secret established by GBA to secure communications on that interface. The NAF 122 may form at least part of the DM server 120 or may exist separately from the DM server 120. In this any, the NAF could be any application.

For example, the NAF 122 may be the DM server 120, i.e. the NAF 122 may be identical to the DM server 120, or it may be a plug-in component in the DM server 120.

Alternatively, the NAF 122 may act as a proxy in front of the DM server 120. As a proxy, the NAF 122 would terminate the connection from the UE 110 (thus acting as a server to the UE 110) and start a new connection with the DM server 120 (thus acting as a client to the DM server 12).

Alternatively, the NAF 122 may act as a router, located between the UE 110 and the DM server 120 and between the UE 110 and the BSF 130. The NAF 122 may then pass most Ua 150 and/or Ua' 152 traffic from the UE 110 on to the DM server 120 and pass all Ua 150 and/or Ua' 152 traffic from the DM server 120 back to the UE 110. In the Ub "tunneling" implementations (FIGS. 6 and 7), the NAF 122 can detect "tunnelled" Ub 160 traffic from the UE 110 and pass that on to the BSF 130 rather than the DM server 120. Similarly, when the NAF 122 receives Ub 160 traffic (or a GPI response in the push implementations) from the BSF 130, the NAF 122 passes that traffic on to the UE 110.

Located either as at least part of the DM server 120 or located separately from the DM server 120, the NAF 122 can terminate the security established over the Ua 150 interface using the Ks_NAF (or a key(s) derived from the Ks_NAF) and then pass the Ua 150 traffic on to the DM server 130, either unencrypted, or encrypted in a way that does not necessarily require the DM server 130 to be GBA aware. In this way, the functionality of the DM server 130 does not have to be altered in any way and does not need to be 'GBA aware'.

The DM server 130 may, for example, be a DM bootstrapping server, a LWM2M server, a LWM2M bootstrapping server, a bootstrapping server, or any generic application that may benefit from GBA.

In the above described push implementation, the GPI response comprises information that enables the NAF 122 and the UE 110 to set up a secure association (SA). The information may include at least one of a GPI version number (Ver), a RAND, an AUTN or AUTN* (for GBA_U), an identifier of the UICC application that may be used as part of the GBA process (App_Lbl), an indicator for use of GBA_ME or GBA_U (U/M), an identifier of the NAF, which may be a concatenation of NAF FQDN and Ua security protocol Id (NAF_Id), a requested NAF-Key lifetime (Key_LT), a NAF_SA Identifier (P-TID) and/or a message authentication code over GPI (MAC).

In the above described embodiments, the GUSS is supplied to the BSF 130 by the HLR/HSS 140. However, the GUSS may alternatively be obtained by the BSF 130 from any other suitable location. For example, the BSF 130 itself may store and manage GUSS (for example, on a database), or any other network component may store and manage GUSS. Alternatively, the BSF 130 and/or any other network component may store and manage at least part of the GUSS functionality, for example the BSF 130 or any other network component may keep a record of which subscriptions are allowed to do GBA and for which NAFs and services. The BSF 140 may make its own judgments regarding key lifetimes and may create its own toll tickets/billing information etc. These implementations may particularly be utilised if the HLR/HSS 140 is not 'GBA aware'.

In the above described embodiments, example interface commands or parameters are described for carrying the data of the "tunnelled" interface, for example, "Write", "Register" and "Update". However, it will be appreciated that the interface carrying the "tunnelled" interface may utilise any suitable protocol and that any suitable commands or parameters within that protocol may be used to carry the tunnelled interface data.

In the above described embodiments, each of the BSF 130, DM server 120 and NAF 122 are shown in the Figures as being implemented on single server elements. However, it will be appreciated that the functionality each of BSF 130, the DM server 120 and the NAF 122 may be spread across two or more devices, each of which may be co-located or located at a distance from one another.

Furthermore, in the above described embodiments and the representations shown in the Figures, the interfaces between the NAF 122 and the UE 110, between the BSF 130 and the NAF 122 and between the BSF 130 and the HLR/HSS 140 are represented as direct interfaces. However, it will be appreciated that any one or more of those interfaces may take any suitable form, whereby one or more intermediate devices or elements, for example communication routing devices, may be implemented as part of the interfaces.

The invention claimed is:

1. A computing system comprising:
    a network application function (NAF) for establishing secure communication between the NAF and a machine to machine (M2M) device;
    at least one processor; and
    a computer readable hardware storage device having stored thereon computer-executable instructions which, when executed by the at least one processor, cause the computing system to perform the following:
        receive a first data object;
        in response to determining that the M2M device is registered for push services, use a push message to tunnel the first data object to the M2M device via an interface between the NAF and the M2M device, the first data object enabling the M2M device to derive first information to establish said secure communication, wherein determining that the M2M device is registered for push services is performed by the M2M device sending a notification to the NAF to inform the NAF the M2M device is registered and at least one of:
- the NAF, which includes a pre-established table that is based on M2M information, checking the pre-established table to determine whether the M2M device is registered; or
- the NAF refraining from checking whether the M2M device is registered and instead relying on a response from a bootstrapping server function (BSF), where the BSF determines whether the M2M device is registered and informs the NAF in the response;

receive a second data object; and derive second information for use in establishing said secure communication with the M2M device.

2. The computing system of claim 1, wherein:
the second data object is a new shared secret;
the new shared secret is derivable at least in part from at least part of a third data object;
the third data object is derived from an existing shared secret; and
the existing shared secret is shared between a network data store and the M2M device.

3. The computing system of claim 1, wherein execution of the computer-executable instructions further causes the computing system to:

receive, via the interface between the NAF and the M2M device, a tunneled request for the first data object, the tunneled request comprising an identifier of the M2M device; and provide the tunneled request for the first data object to a bootstrapping server function.

4. The computing system of claim 1, being further configured to:

receive a transaction identifier from a bootstrapping server function; and tunnel the transaction identifier to the M2M device via the interface between the NAF and the M2M device.

5. The computing system of claim 1, being further configured to:

receive, via the interface between the M2M device and the NAF, a tunnelled authentication data object; and provide the authentication data object to a bootstrapping server function.

6. The computing system of claim 1, being further configured to:

receive from a bootstrapping server function a notification of successful authentication; and tunnel the notification of successful authentication to the M2M device via the interface between the M2M device and the NAF.

* * * * *